(12) United States Patent
Gourevitch et al.

(10) Patent No.: US 10,936,135 B2
(45) Date of Patent: Mar. 2, 2021

(54) SINGLE LAYER TOUCH SENSOR PANEL ARCHITECTURE

(71) Applicant: Apple Inc., Cupertino, CA (US)

(72) Inventors: Alexandre Gourevitch, San Jose, CA (US); Christophe Blondin, Sunnyvale, CA (US); Ashray Vinayak Gogte, Sunnyvale, CA (US); Xiaoqi Zhou, Cupertino, CA (US); Vipul Chawla, San Jose, CA (US); Robert Leo Sheridan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/459,314

(22) Filed: Jul. 1, 2019

(65) Prior Publication Data

US 2020/0026393 A1     Jan. 23, 2020

Related U.S. Application Data

(60) Provisional application No. 62/699,534, filed on Jul. 17, 2018.

(51) Int. Cl.
     *G06F 3/044*          (2006.01)
     *G06F 3/041*          (2006.01)

(52) U.S. Cl.
     CPC .......... *G06F 3/0446* (2019.05); *G06F 3/0443* (2019.05); *G06F 3/04164* (2019.05);
(Continued)

(58) Field of Classification Search
     CPC .. G06F 3/0446; G06F 3/04164; G06F 3/0443; G06F 2203/04103;
(Continued)

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000163031 A | 6/2000 |
| JP | 2002342033 A | 11/2002 |
| WO | 2008/121411 A1 | 10/2008 |

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

(Continued)

*Primary Examiner* — Tom V Sheng
(74) *Attorney, Agent, or Firm* — Kubota & Basol LLP

(57) ABSTRACT

A touch sensor panel is disclosed. In some examples, the touch sensor panel comprises a first layer including a plurality of drive lines including drive electrodes, wherein the drive lines are configured to be coupled to drive circuitry during touch sensing on the touch sensor panel. In some examples, the first layer includes a plurality of sense lines including sense electrodes, wherein the sense lines are configured to be coupled to sense circuitry during the touch sensing on the touch sensor panel. In some examples, the first layer includes a plurality of first shielding electrodes, wherein the first shielding electrodes are disposed between the drive electrodes and the sense electrodes. In some examples, the touch sensor panel comprises a second layer, different than the first layer, including one or more bridges electrically coupling at least two of the first shielding electrodes together.

20 Claims, 12 Drawing Sheets

(52) U.S. Cl.
CPC .............. *G06F 2203/04103* (2013.01); *G06F 2203/04107* (2013.01); *G06F 2203/04111* (2013.01); *G06F 2203/04112* (2013.01)

(58) Field of Classification Search
CPC . G06F 2203/04107; G06F 2203/04111; G06F 2203/04112
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 9,298,327 | B2 | 3/2016 | Wenzel |
| 9,665,210 | B2 * | 5/2017 | Kim .................... G06F 3/0418 |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2010/0328228 | A1 * | 12/2010 | Elias ...................... G06F 3/045 345/173 |
| 2014/0168138 | A1 * | 6/2014 | Kuo ....................... G06F 3/044 345/174 |
| 2014/0375910 | A1 * | 12/2014 | Tada ..................... G06F 1/1692 349/12 |
| 2015/0077383 | A1 * | 3/2015 | Kang .................... G06F 3/0446 345/174 |
| 2015/0160754 | A1 * | 6/2015 | Wenzel .................. G06F 3/044 345/174 |
| 2015/0179122 | A1 * | 6/2015 | Brown ................. G09G 3/3696 345/174 |
| 2015/0220173 | A1 * | 8/2015 | Lu ......................... G06F 3/0412 345/174 |
| 2015/0309531 | A1 * | 10/2015 | Tanemura ........... G06F 3/04166 345/174 |
| 2016/0109977 | A1 * | 4/2016 | Hashimoto ............. G06F 3/044 345/174 |
| 2018/0004027 | A1 * | 1/2018 | Lin ................... G02F 1/134309 |
| 2018/0224967 | A1 | 8/2018 | Church et al. |
| 2018/0224984 | A1 | 8/2018 | Kim et al. |
| 2019/0102010 | A1 * | 4/2019 | Knabenshue ........... G06F 3/044 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report and Written Opinion received for PCT Patent Application No. PCT/US2019/042084, dated Oct. 23, 2019, 9 pages.

* cited by examiner

SINGLE LAYER TOUCH SENSOR PANEL ARCHITECTURE

CROSS REFERENCE TO RELATED APPLICATIONS

This application claims benefit of U.S. Provisional Patent Application No. 62/699,534, filed Jul. 17, 2018, the contents of which are hereby incorporated by reference in their entirety for all purposes.

FIELD OF THE DISCLOSURE

This relates generally to touch sensor panels, and more particularly to touch sensor panels containing drive electrodes, sense electrodes and ground and/or floating electrodes in a single layer.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Examples of the disclosure are directed to various touch sensor panel architectures in which drive, sense and/or shield electrodes are disposed in a single layer of the touch sensor panels. In some examples, various bridges electrically connecting the shield layers are formed in another layer of the touch sensor panels. In some examples, the shield layers form X-shaped structures disposed between drive and sense electrodes on the touch sensor panels. In some examples, the shield layers are grounded or floating. These shielding layers can improve the performance of the touch sensor panels.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates (e.g., touch electrodes) made of materials such as Indium Tin Oxide (ITO), conductive polymers, metal mesh, nanowires or nanotubes, and some touch screens can be formed by at least partially integrating touch sensing circuitry into a display pixel stackup (i.e., the stacked material layers forming the display pixels). Examples of the disclosure are directed to various touch sensor panel architectures in which drive, sense and/or shield electrodes are disposed in a single layer of the touch sensor panels. In some examples, various bridges electrically connecting the shield layers are formed in another layer of the touch sensor panels. In some examples, the shield layers form X-shaped structures disposed between drive and sense electrodes on the touch sensor panels. In some examples, the shield layers are grounded or floating. These shielding layers can improve the performance of the touch sensor panels.

Figure 1A:
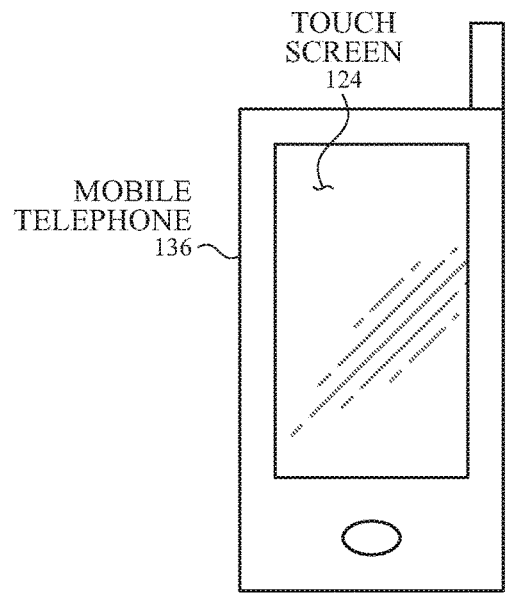
FIGS. 1A-1D illustrate an example mobile telephone, an example media player, an example personal computer and an example tablet computer that can each include an exemplary touch screen according to examples of the disclosure.
Figure 1B:
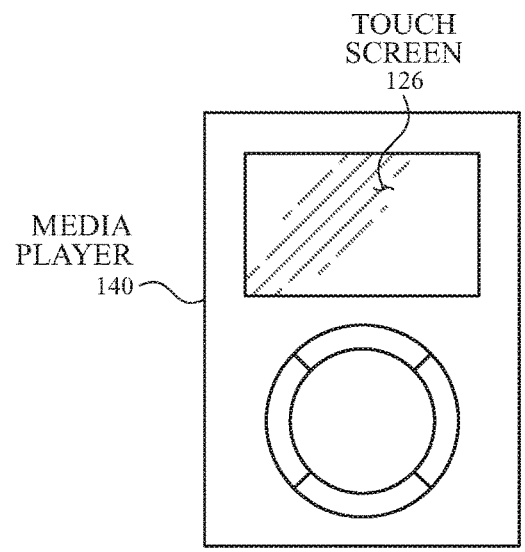
Figure 1C:
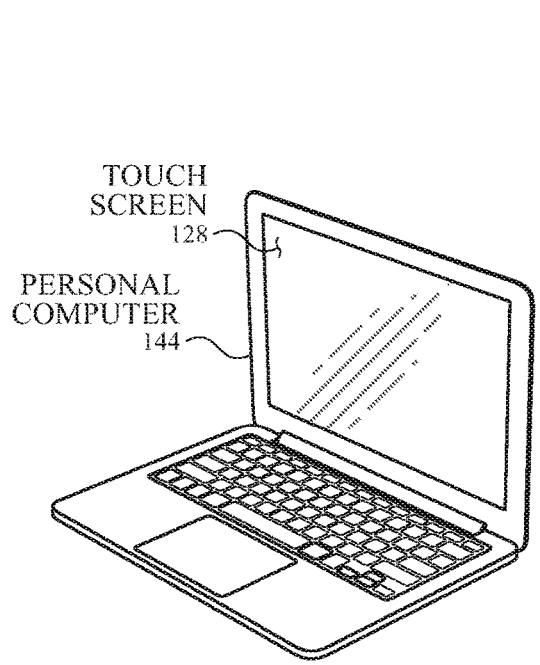
Figure 1D:
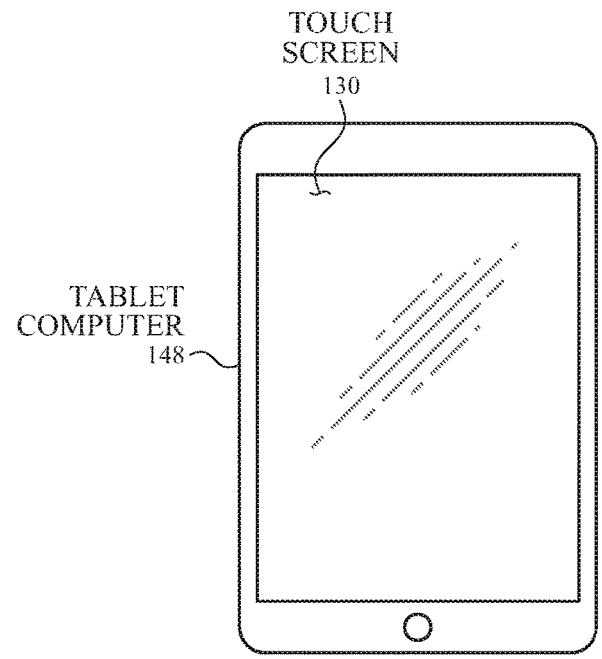

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. In such examples, each touch node electrode can be individually coupled to sense circuitry (circuitry that will be described later) via individual traces. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance-based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128 and 130 can be based on mutual capacitance and/or self-capacitance. The electrodes can be arrange as a matrix of small, individual plates of conductive material, or as drive lines and sense lines, or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
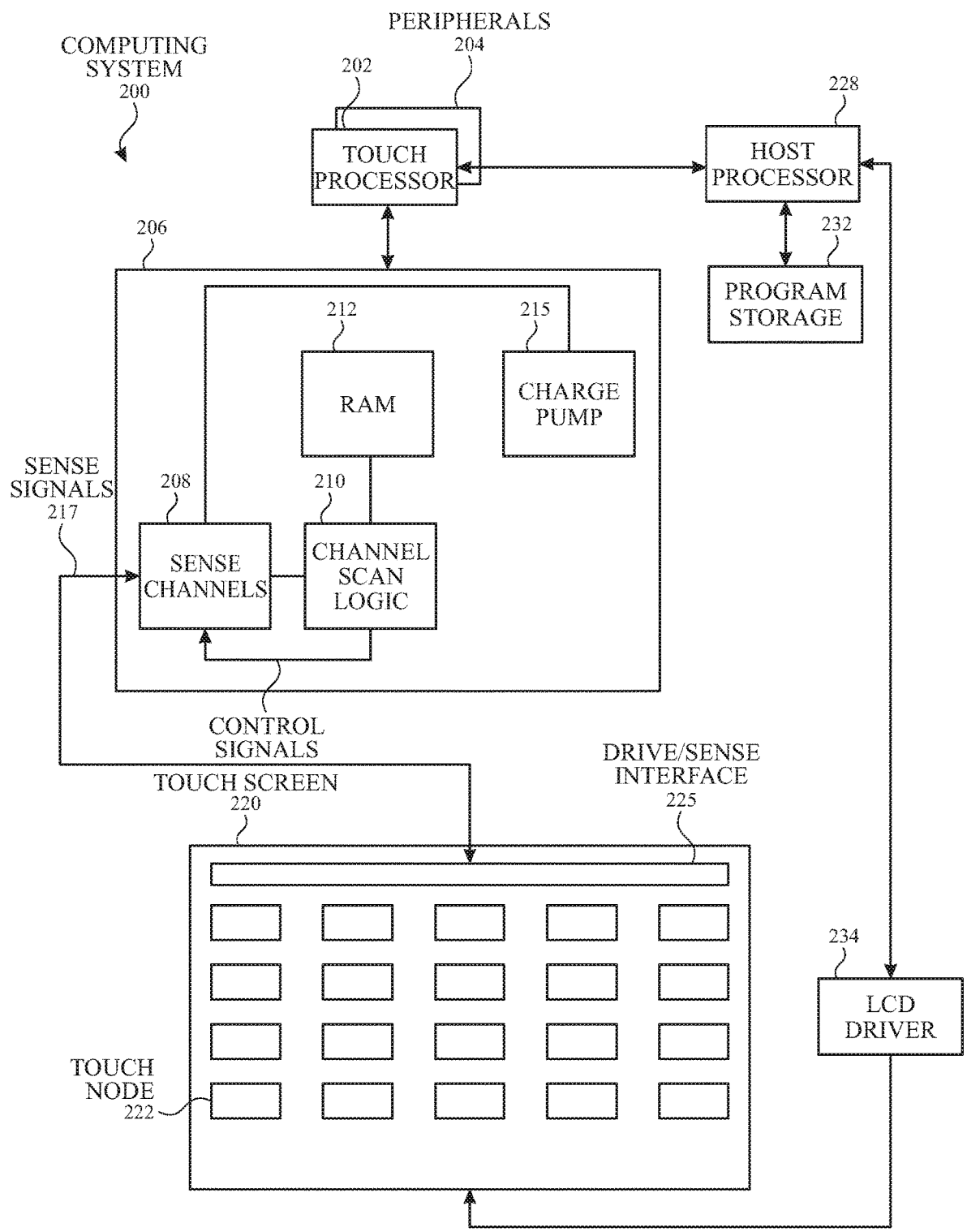
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above and below. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In some examples, RAM 212 can contain various configuration information for specific touch screen 220 scans performed by channel scan logic 210 (e.g., scan specific configuration information for sense channels 208), can receive and/or store touch data from sense channels 208, and can be managed by channel scan logic 210. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. In some examples, drive/sense interface 225 can be implemented in the touch controller 206, or can be implemented in a chip separate from touch controller 206. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234 (or an LED display or OLED display driver, or more generally, a display driver). The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing. It is understood that in some examples, touch screen 220 need not be integrated in a display module or stackup (e.g., need not be in-cell), but can instead be separate from the display module or stackup (e.g., a discrete touch sensor panel that is not part of a display, and is merely overlaid on the display or is separate from the display).

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
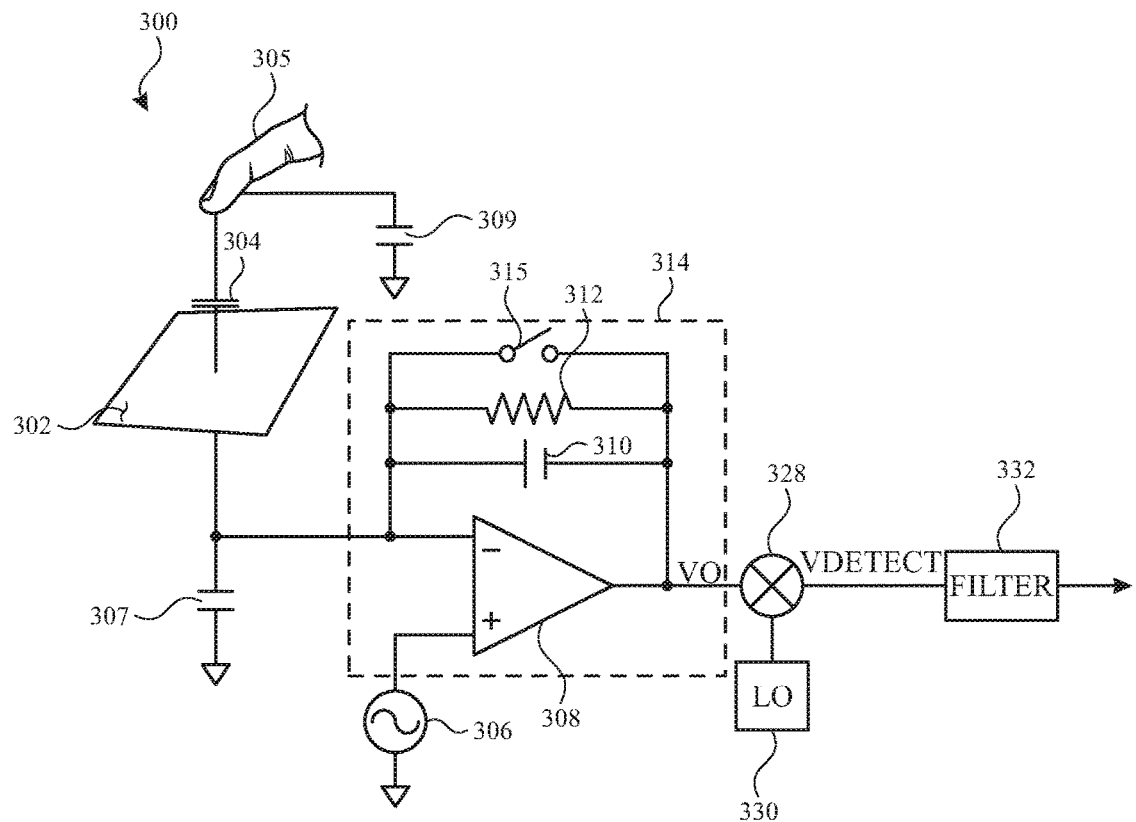
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance Cstray 307 to ground associated with it, and also an additional self-capacitance C 304 to ground that is formed when an object, such as finger 305, is in proximity to or touching the electrode. The total self-capacitance to ground of touch node electrode 302 can be illustrated as capacitance C 304+Cstray 307. Finger 305 can have capacitance Cbody 309 to ground. Note that Cbody 309 can typically be much larger than C 304 such that the total series capacitance of C 304 and Cstray 307 can be approximately C 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. As such, touch sensor circuit 300 can be configured to sense changes in the total self-capacitance 304 of the touch node electrode 302 induced by a finger or object either touching or in proximity to the touch sensor panel. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred; for example, the DC portion of Vdetect can be used by a processor to determine the presence of a proximity or touch event, or the output can be inputted into a discrete logic network to determine the presence of a proximity or touch event. Note that while FIG. 3A indicates the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Figure 3B:
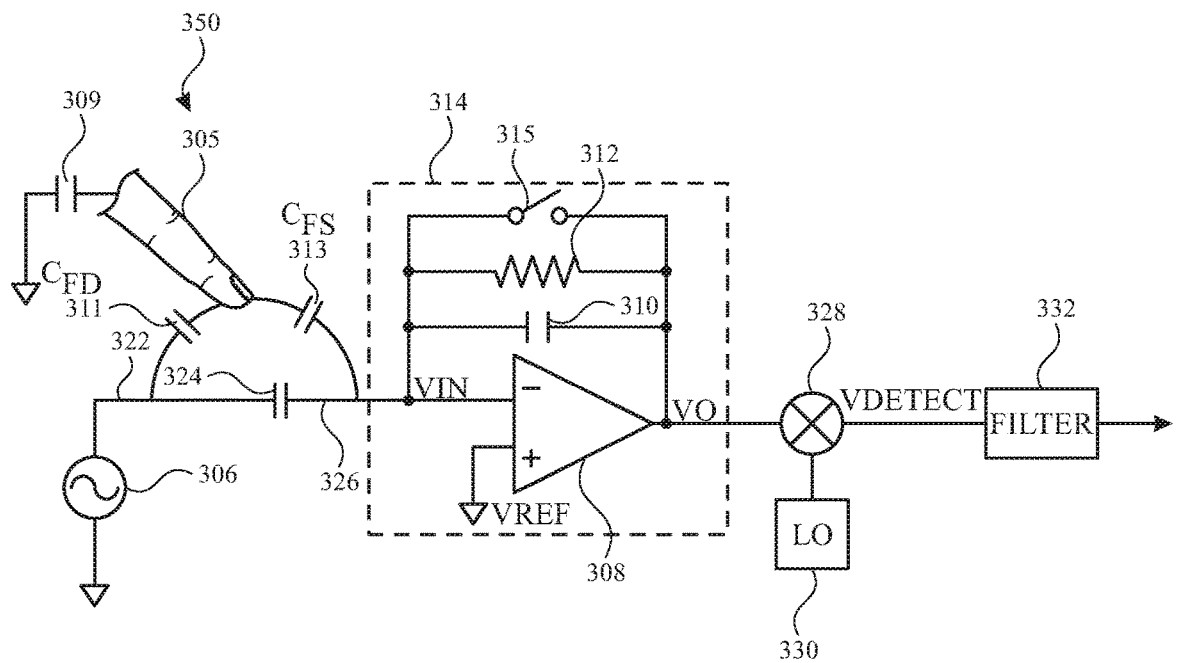
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered as indicated by capacitances $C_{FD}$ 311 and $C_{FS}$ 313, which can be formed between drive line 322, finger 305 and sense line 326. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIG. 3B indicates the demodulation at multiplier 328 occurs in the analog domain, output Vo may be digitized by an ADC, and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
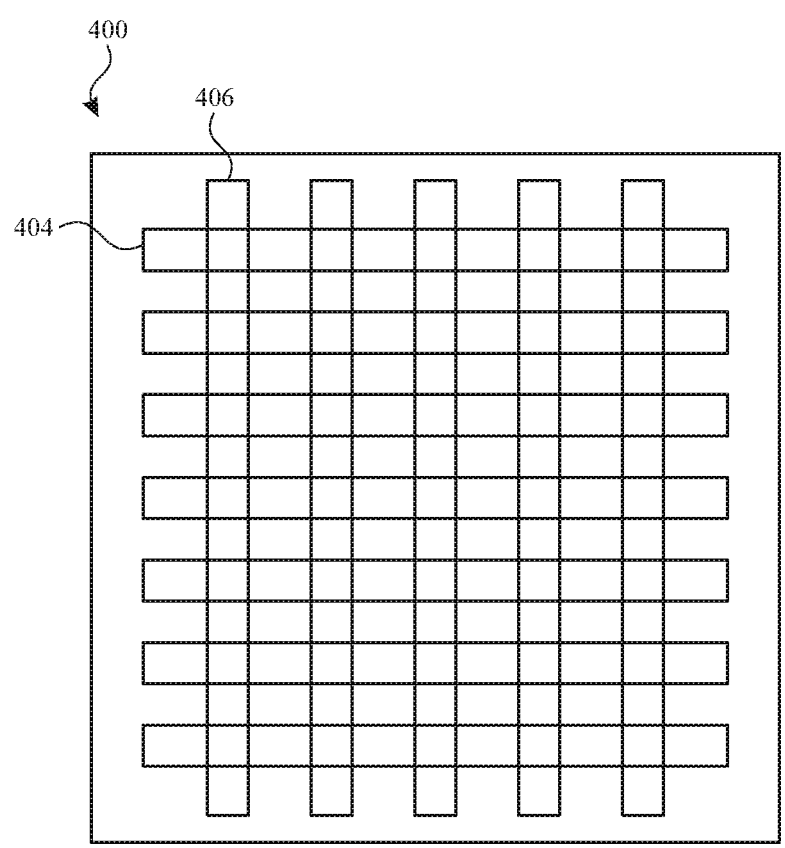
FIG. 4 illustrates a touch screen with sense lines arranged in rows and drive lines arranged in columns according to examples of the disclosure.

FIG. 4 illustrates touch screen 400 with drive lines 406 and sense lines 404 arranged in columns and rows (or more generally, arranged in a first direction and a second direction, different than the first direction), respectively, according to examples of the disclosure. Specifically, touch screen 400 can include one or more touch electrodes disposed as columns that form drive lines (e.g., single contiguous electrodes, or noncontiguous electrodes electrically coupled together using electrical bridges), and one or more touch electrodes disposed as rows that form sense lines (e.g., single contiguous electrodes, or noncontiguous electrodes electrically coupled together using electrical bridges). The touch electrodes can be on the same or different material layers on touch screen 400, and the drive lines 406 and the sense lines 404 and can intersect with each other while remaining electrically isolated from each other, as illustrated in FIG. 4. In some examples, touch screen 400 can sense the self-capacitance of lines 404 and 406 to detect touch and/or proximity activity on touch screen 400, and in some examples, touch screen 400 can sense the mutual capacitance between lines 404 and 406 to detect touch and/or proximity activity on touch screen 400.

Figure 5:
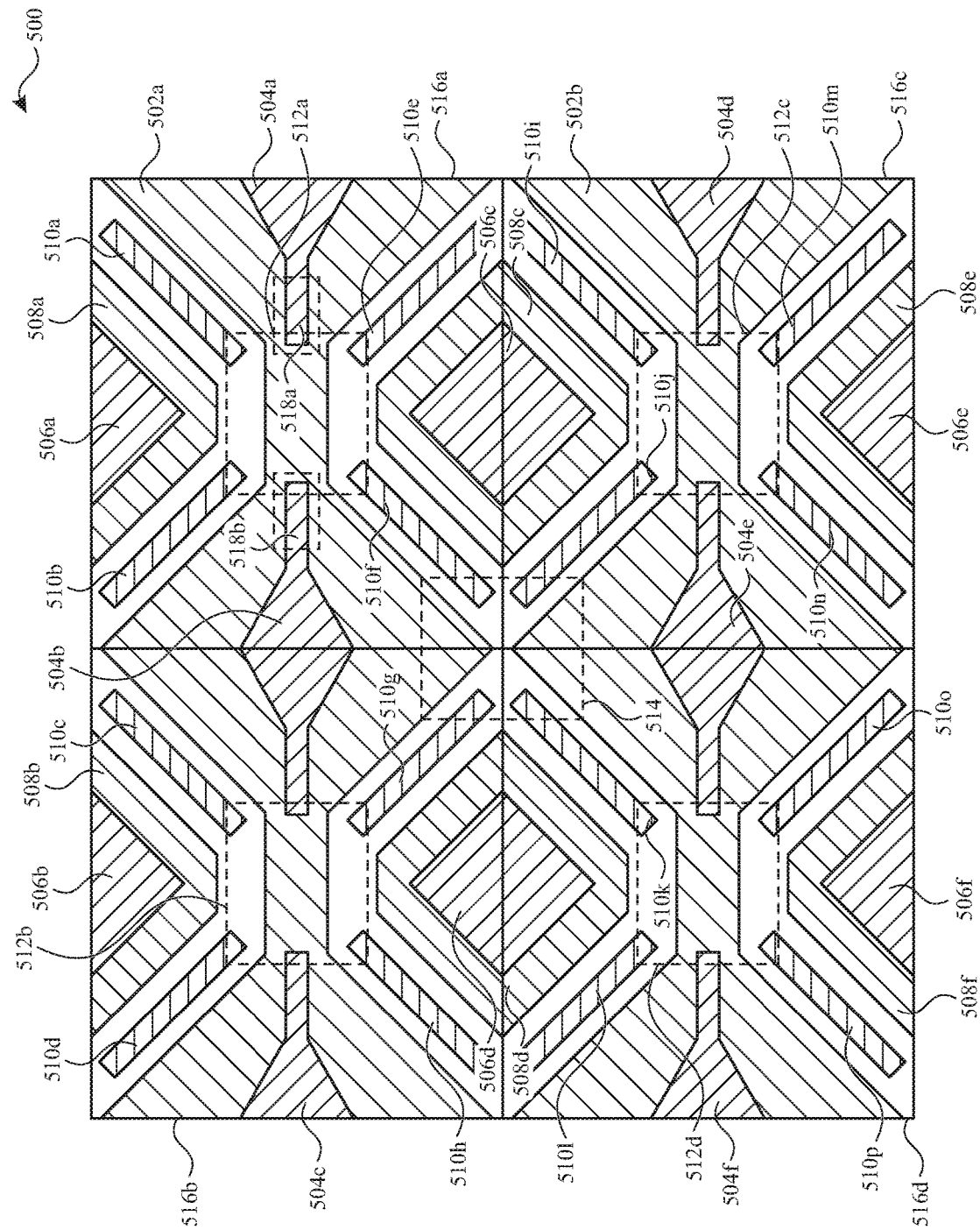
FIG. 5 illustrates an exemplary single layer touch sensor panel configuration showing four touch cells arranged in a diamond X pattern with drive electrodes, sense electrodes and ground/floating electrodes embedded inside the drive and the sense electrodes and surrounding the drive and the sense electrodes as shields according to examples of the disclosure.

FIG. 5 illustrates an exemplary single layer touch sensor panel configuration showing four touch cells arranged in a diamond X pattern with drive electrodes, sense electrodes and ground/floating electrodes embedded inside the drive and the sense electrodes and surrounding the drive and the sense electrodes as shields according to examples of the disclosure. Specifically, in configuration 500 of FIG. 5, four touch cells 516a-516d can be arranged in a diamond X pattern in a single layer touch sensor panel (it is understood that the touch sensor panels of the disclosure can include fewer or more touch cells 516 than those illustrated in FIG.

5). It is understood that for the purposes of this disclosure, a "single layer touch panel" can be made of one or more conductive layers with a thin layer of dielectric separating the conductive layers (e.g., with no substrate separating the conductive layers from one another). The dielectric layer separating the different conductive layers of the touch sensor panel can be different than a substrate in that the dielectric layer can be unable to provide mechanical support/integrity to the layers of the touch sensor panel if it were freestanding, without a substrate (which can provide mechanical support/integrity to the layers of the touch sensor panel) upon which the layers of the touch sensor panel described herein can be disposed. It is also understood that while the figures of the disclosure (e.g., FIGS. 5-12) show gaps between the various electrodes of the disclosure (e.g., drive, sense, ground/floating), in some examples the gaps can represent merely electrical discontinuities in connecting metal mesh materials (in the case of metal mesh structures, physical breaks in the wires that make up the metal mesh material, non-conductive regions of the wires that make up the metal mesh material, etc.), small gaps in connecting metal films such as ITO (in the case of metal film structures), or any other electrical barrier (e.g., a barrier material) between the various electrodes of the disclosure. The gaps illustrated in the figures are, thus, understood to be exaggerated for ease of description for some examples of the disclosure, and the gaps illustrated in the figures may, thus, not be visible or present in some examples of the disclosure (e.g., in the case of a touch sensor panel in which the drive, sense and ground/floating electrodes are formed of a metal mesh layer with electrically isolated regions of the metal mesh layer forming the drive, sense and ground/floating electrodes).

In some examples, the single layer touch sensor panel can be implemented in one or more ITO layers. For example, the drive, sense and ground/floating electrodes can be formed in a single ITO layer in the touch sensor panel. In some examples, the drive and sense electrodes can be formed in an ITO layer of the one or more layers of the single layer touch panel and the ground/floating electrodes can be formed in another ITO layer of the one or more layers of the single layer touch panel. In some examples, the drive and ground/floating electrodes can be formed in an ITO layer of the one or more layers of the single layer touch panel and the sense electrodes can be formed in another ITO layer of the one or more layers of the single layer touch panel. In some examples, the sense and ground/floating electrodes can be formed in an ITO layer of the one or more layers of the single layer touch panel and the drive electrodes can be formed in another ITO layer of the one or more layers of the single layer touch panel. In some examples, the single layer touch sensor panel can be implemented in one or more layers of metal mesh (e.g., the drive, sense and/or the ground/floating electrodes can be formed on one or more layers of metal mesh in a single layer on the touch sensor panel in similar one or more combinations as described above with respect to ITO layer). In some examples, the single layer touch sensor panel can be implemented as a mix of ITO and metal mesh, or can be implemented with other materials.

In some examples, touch cells 516a-516d can include drive electrodes, sense electrodes and ground and/or floating electrodes embedded inside the drive and the sense electrodes and surrounding the drive and the sense electrodes as shields and can be disposed in the same layer as the drive and sense electrodes (e.g., disposed between different pairs of drive and sense electrodes), though electrically isolated from the drive and sense electrodes. In some examples, the ground electrodes embedded inside the drive and the sense electrodes and surrounding the drive and the sense electrodes as shields can improve the performance of an ungrounded touch sensor panel. For example, in cases where a user may not hold the electronic device in which the touch sensor panel is included (e.g., the electronic device can be laying on a surface), the capacitive touch sensors of the touch panel device can be ungrounded leading to poor touch performance, such as increases in touch sensing error, and increased negative pixel effects. These problems can be eased by placing more ground mass/elements (e.g., ground electrodes embedded inside the drive and the sense electrodes and surrounding the drive and the sense electrodes as shields) in the touch sensing layer, as described in this disclosure, that can be effectively grounded by the user's finger or any other touch object when that finger/object is touching the touch sensor panel, thus effectively grounding the touch sensor panel even when a user is not holding the electronic device in which the touch sensor panel is included.

In some examples, such as illustrated in FIG. 5, sense lines can be formed of contiguous sense electrodes and drive lines can be formed of noncontiguous drive electrodes connected together with electrical bridges. In some examples, drive lines can be formed of contiguous drive electrodes and sense lines can be formed of noncontiguous sense electrodes connected together with electrical bridges. In some examples, drive lines can be formed of noncontiguous drive electrodes connected together with electrical bridges and sense lines can be also be formed of noncontiguous sense electrodes connected together with electrical bridges.

For example, touch cells 516a-516d can include drive electrodes 508a-508f (e.g., arranged in columns of electrodes) and sense electrodes 502a and 502b (e.g., arranged in rows). Drive electrodes 508 can correspond to drive lines 322 in FIG. 3B, and sense electrodes 502 can correspond to sense lines 326 in FIG. 3B. In some examples, ground and/or floating electrodes can be embedded inside sense electrodes. For example, ground and/or floating electrodes 504a-504f can be embedded inside sense electrodes 502a and 502b. In some examples, ground and/or floating electrodes can be embedded inside drive electrodes. For example, ground and/or floating electrodes 506a-506f can be embedded inside drive electrodes 508a-508f. In some examples, ground and/or floating electrodes embedded inside sense or drive electrodes can have extensions. For example, for touch unit cell 516a, ground electrode 504a embedded inside sense electrode 502a can have an extension 518a and ground electrode 504b embedded inside sense electrode 502a can have an extension 518b (it is understood that the touch sensor panel of the disclosure can include fewer or more extensions 518 than those illustrated in FIG. 5). In some examples, ground and/or floating electrodes embedded inside sense or drive electrodes may not have extensions. For example, for touch unit cell 516a, ground electrode 506a embedded inside drive electrode 508a may not have an extension and ground electrode 506c embedded inside drive electrode 508c may not have an extension.

In some examples, electrodes 506a-506f can be grounded (e.g., coupled to a reference voltage such as ground) while electrodes 504a-504f can be floating (e.g., at high impedance, or uncoupled from any voltage source). In some examples, electrodes 506a-506f can be floating (e.g., at high impedance, or uncoupled from any voltage source) while electrodes 504a-504f can be grounded. In some examples, both electrodes 504a-504f and 506a-506f can be grounded. In some examples, both electrodes 504a-504f and 506a-506f can be floating.

In some examples, ground and/or floating electrodes can surround the drive and the sense electrodes, and be placed between the drive and the sense electrodes (e.g., disposed between different pairs of drive and sense electrodes), in an X shape and act as shields. The shields can provide the above-described grounding effect to reduce or eliminate parasitic or stray capacitances between the different elements of the single layer touch sensor cells (e.g., between the drive and sense electrodes) thereby improving the signal to noise ratio of the touch sensor. The shields can also provide space between the drive electrodes and the sense electrodes of the single layer touch sensor cells thereby improving the touch dynamic range and the touch sensing performance of the touch sensor panel.

For example, ground and/or floating electrodes 510a-510p can surround the drive electrodes 508a-508f and the sense electrodes 502a and 502b in an X shape, and can be disposed between the drive electrodes 508 and the sense electrodes 502 in the same layer as the drive and sense electrodes, though electrically isolated from the drive and sense electrodes. Specifically, in touch unit cell 516a, ground and/or floating electrodes 510a, 510b, 510e and 510f can be arranged in an X shape and the dashed box 512a can represent the center of the X shape. In some examples, the electrodes of a touch cell forming the X shape can be in an open configuration in which the electrodes forming the X shape do not intersect with each other. In some examples, the electrodes of a touch cell forming the X shape can be in a closed configuration in which the electrodes forming the X shape intersect with each other. For example, in touch unit cell 516a, electrodes 510a, 510b, 510e and 510f can be in an open configuration and do not intersect with each other. In some examples, electrodes 510a and 510b can be connected to electrodes 510f and 510e respectively at the center of the dashed box 512a and form a closed configuration (e.g., electrodes 510a, 510b, 510e and 510f can be formed of a contiguous material, or electrodes 510a, 510b, 510e and 510f can be coupled to each other via one or more electrical bridges that are formed in another layer of the touch sensor panel). In FIG. 5, electrodes 510a and 510b can act as shields between drive electrode 508a and sense electrode 502a and electrodes 510e and 510f can act as shields between drive electrode 508c and sense electrode 502a. As before, electrodes 510a, 510b, 510e and 510f can be grounded or floating.

In some examples, ground and/or floating electrodes of adjacent cells can form an X shape. For example, in FIG. 5, electrode 510f of cell 516a, electrode 510g of cell 516b, electrode 510k of cell 516d and electrode 510j of cell 516c can form an X shape and dashed box 514 can represent the center of the X shape. In some examples, electrode 510f of cell 516a may not connect to electrode 510k of cell 516d and electrode 510g of cell 516b may not connect to electrode 510j of cell 516c at the center of dashed box 514, such as shown in the embodiment of FIG. 5, thereby forming an open configuration. In some examples, electrode 510f of cell 516a can be connected to electrode 510k of cell 516d and electrode 510g of cell 516b can be connected to electrode 510j of cell 516c at the center of dashed box 514, thereby forming a closed configuration (e.g., electrodes 510f, 510k, 510g and 510j can be formed of a contiguous material, or electrodes 510f, 510k, 510g and 510j can be coupled to each other via one or more electrical bridges that are formed in another layer of the touch sensor panel). Unless otherwise stated, the reference numbers used for the touch sensor panel structure described with reference to FIG. 5 can apply any of the figures that follow, which may omit some of these reference numbers for clarity of illustration.

In some examples, one drive electrode can be connected via an electrical bridge (e.g., formed in another layer of the touch sensor panel) to another drive electrode. In some examples, ground and/or floating electrodes can be connected together in various patterns using bridges (e.g., formed in another layer of the touch sensor panel). In some examples, ground/floating electrodes embedded inside the drive electrodes can be connected via bridges (e.g., formed in another layer of the touch sensor panel) to the ground/floating electrodes surrounding the drive and the sense electrodes in an X shape. In some examples, ground/floating electrodes embedded inside the sense electrodes can be connected via bridges (e.g., formed in another layer of the touch sensor panel) to the ground/floating electrodes surrounding the drive and the sense electrodes in an X shape, such as will be described with respect to and illustrated in FIGS. 6-8 and 10-11. In some examples, the bridges can be implemented in one or more layers including the touch layer. In some examples, the bridges can be implemented in one or more layers different from the touch layer. In some examples, all the bridges (bridges connecting drive electrodes, bridges connecting ground/floating electrodes) can be implemented in the same layer, which can be different from the touch layer. In some examples, some of the bridges can be implemented in one layer (e.g., bridges connecting drive electrodes), and some of the bridges can be implemented in another layer (e.g., bridges connecting ground/floating electrodes) and both the layers can be different from the touch layer. In some examples in which the drive, sense and/or ground/floating electrodes are dispersed between two different layers of the touch sensor panel, as described previously, one layer of the touch sensor panel can include only a subset of the drive, sense and/or ground/floating electrodes, and the other layer of the touch sensor panel can include the bridges and the remaining of the drive, sense and/or ground/floating electrodes (e.g., the dielectric layer that separates the two layers of drive, sense and/or ground/floating electrodes from one another can be the same dielectric layer that separates the bridges from the layer of the touch sensor panel that includes the other set of drive, sense and/or ground/floating electrodes). Various bridge connection schemes will be described with reference to FIGS. 6-8 and 10-11.

Figure 6:
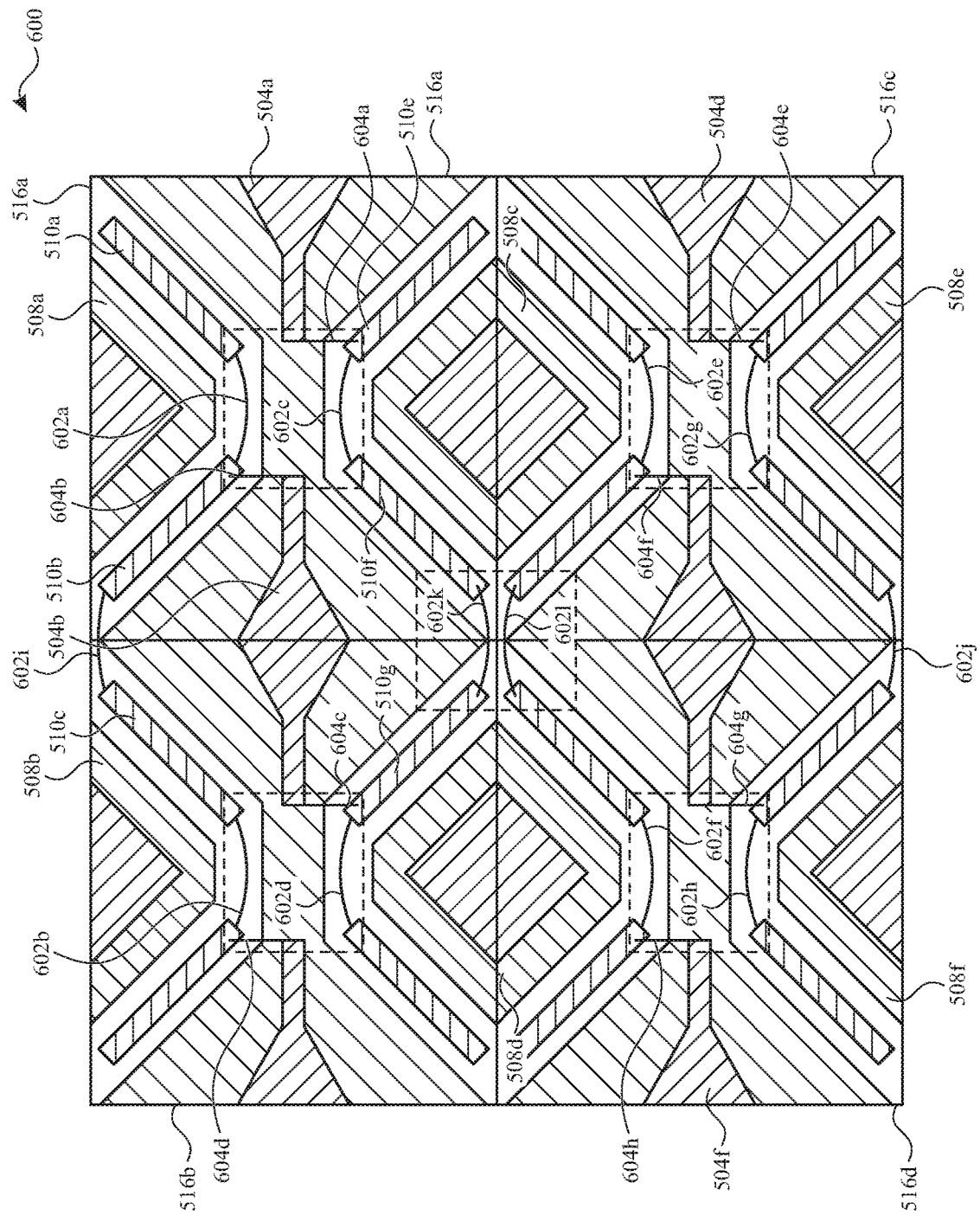
FIG. 6 illustrates an exemplary bridge arrangement connecting different ground/floating electrodes of four adjacent touch cells arranged in a diamond X pattern according to examples of the disclosure.

FIG. 6 illustrates an exemplary bridge arrangement connecting different ground/floating electrodes of four adjacent touch cells arranged in a diamond X pattern according to examples of the disclosure. Specifically, in configuration 600 of FIG. 6, bridges 602a-602j can connect different ground/floating electrodes forming an X shape together and bridges 604a-604h can connect a ground/floating electrode forming an X shape to a ground/floating electrode embedded inside a sense electrode. For example, in touch unit cell 516a, electrode 510a can be connected to electrode 510b via bridge 602a, electrode 510e can be connected to electrode 510f via bridge 602c (though in some examples, electrode 510a can be contiguous with electrode 510b, and electrode 510e can be contiguous with electrode 510f, as described above), electrode 510b can be connected to electrode 504b via bridge 604b and electrode 510e can be connected to electrode 504a via bridge 604a. In some examples, some of bridges 604a-604h can connect a ground/floating electrode forming an X shape to a ground/floating electrode embedded inside a sense electrode and some of bridges 604a-604h can connect a ground/floating electrode embedded inside a sense electrode to another ground/floating electrode embedded inside a sense electrode. In some examples, electrodes of adjacent touch cells can be connected together. For example, in FIG. 6, electrode 510*b* of touch cell 516*a* can be connected to electrode 510*c* of touch cell 516*b* via bridge 602*i* and electrode 510*f* of touch cell 516*a* can be connected to electrode 510*g* of touch cell 516*b* via bridge 602*k* (though in some examples, electrode 510*b* of touch cell 516*a* can be contiguous with electrode 510*c* of touch cell 516*b*, and electrode 510*f* of touch cell 516*a* can be contiguous with electrode 510*g* of touch cell 516*b*, as described above). In some examples, electrodes 504*a*, 504*c*, 504*d* and 504*f* located at the outer edges of the touch sensor panel can be coupled to an outside reference voltage such as ground thereby grounding all the electrodes connected to electrodes 504*a*, 504*c*, 504*d* and 504*f* via bridges. In some examples, electrodes 504*a*, 504*c*, 504*d* and 504*f* located at the outer edges of the touch sensor panel can be floating (e.g., at high impedance, or uncoupled from any voltage source) thereby leaving all the electrodes connected to electrodes 504*a*, 504*c*, 504*d* and 504*f* via bridges floating. In some examples, the electrodes 506 embedded within drive electrodes 508 can be floating while electrodes 504 and 510 can be grounded. The coupling of outer edge electrodes to the reference voltage can be implemented in any of the bridge configurations described herein (e.g., with reference to FIGS. 6-11). In some examples, the bridges can be implemented in one or more layers including the touch layer. For example, in FIG. 6, bridges 602*a*-602*l* can be implemented in the touch layer and bridges 604*a*-604*h* can be implemented in a separate layer or vice-versa. In some examples, the bridges can be implemented in one or more layers different from the touch layer. For example, bridges 602*a*-602*l* can be implemented in a first bridge layer and bridges 604*a*-604*h* can be implemented in a second bridge layer, or bridges 602*a*-602*l* and bridges 604*a*-604*h* can be implemented in a same layer different than the touch layer. In some examples, the electrodes 506 embedded within drive electrodes 508 can be floating while electrodes 504 and 510 can be grounded.

Figure 7:
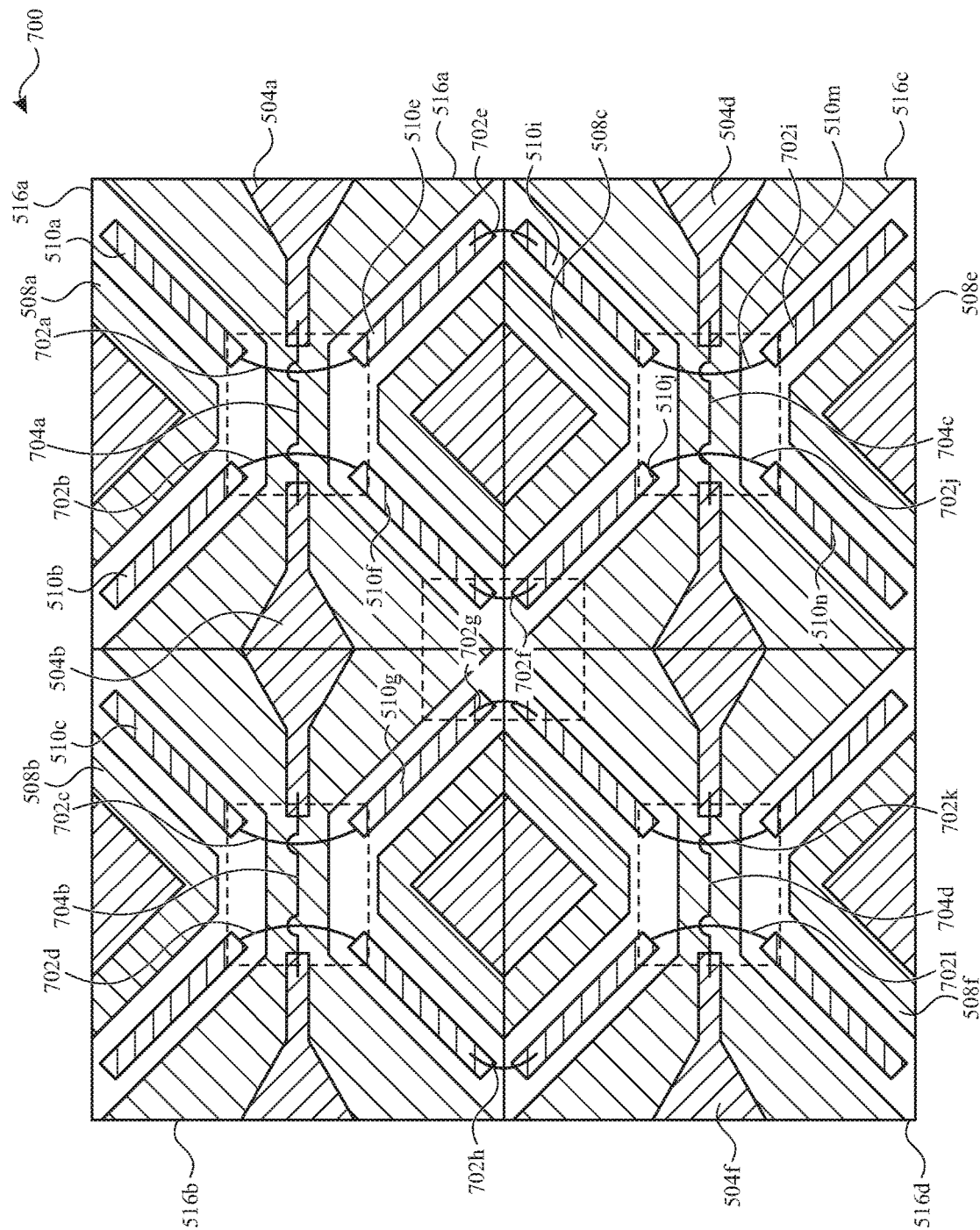
FIG. 7 illustrates another exemplary bridge arrangement connecting different ground/floating electrodes of four adjacent touch cells arranged in a diamond X pattern according to examples of the disclosure.

FIG. 7 illustrates another exemplary bridge arrangement connecting different ground/floating electrodes of four adjacent touch cells arranged in a diamond X pattern according to examples of the disclosure. Specifically, in configuration 700 of FIG. 7, bridges 702*a*-702*l* can connect different ground/floating electrodes forming an X shape together and bridges 704*a*-704*d* can connect a ground/floating electrode embedded inside a sense electrode to another ground/floating electrode embedded inside the sense electrode. For example, in touch unit cell 516*a*, electrode 510*a* can be connected to electrode 510*e* via bridge 702*a*, electrode 510*b* can be connected to electrode 510*f* via bridge 702*b* and electrode 504*a* can be connected to electrode 504*b* via bridge 704*a* (which can be in a different bridge layer than bridges 702*a* and 702*b*). In some examples, for touch cells 516*a* and 516*c*, electrodes 510*a*, 510*b*, 510*m*, 510*n* located at the ends (e.g., top and bottom ends) of the connected chain of X electrodes and electrodes 504*a* and 504*d* located at the outer edges (e.g., the left and right edges) of the touch sensor panel can be coupled to an outside reference voltage such as ground thereby grounding all the electrodes connected to these electrodes via bridges. In some examples, for touch cells 516*a* and 516*c*, electrodes 510*a*, 510*b*, 510*m*, 510*n* located at the ends (e.g., top and bottom ends) of the connected chain of X electrodes and electrodes 504*a* and 504*d* located at the outer edges (e.g., the left and right edges) of the touch sensor panel can be floating (e.g., at high impedance, or uncoupled from any voltage source) thereby leaving all the electrodes connected to these electrodes via bridges floating. In some examples, the electrodes 506 embedded within drive electrodes 508 can be floating while electrodes 504 and 510 can be grounded. In some examples, electrodes of adjacent touch cells can be connected together. For example, in FIG. 7, electrode 510*e* of touch cell 516*a* can be connected to electrode 510*i* of touch cell 516*c* via bridge 702*e* and electrode 510*f* of touch cell 516*a* can be connected to electrode 510*j* of touch cell 516*c* via bridge 702*f* (though in some examples, electrode 510*e* of touch cell 516*a* can be contiguous with electrode 510*i* of touch cell 516*c*, and electrode 510*f* of touch cell 516*a* can be contiguous with electrode 510*j* of touch cell 516*c*, as described above). In some examples, the bridges can be implemented in one or more layers including the touch layer. For example, in FIG. 7, bridges 702*a*-702*l* can be implemented in the touch layer and bridges 704*a*-704*d* can be implemented in a separate layer or vice-versa. In some examples, the bridges can be implemented in one or more layers different from the touch layer. For example, bridges 702*a*-702*l* can be implemented in a first bridge layer and bridges 704*a*-704*d* can be implemented in a second bridge layer.

Figure 8:
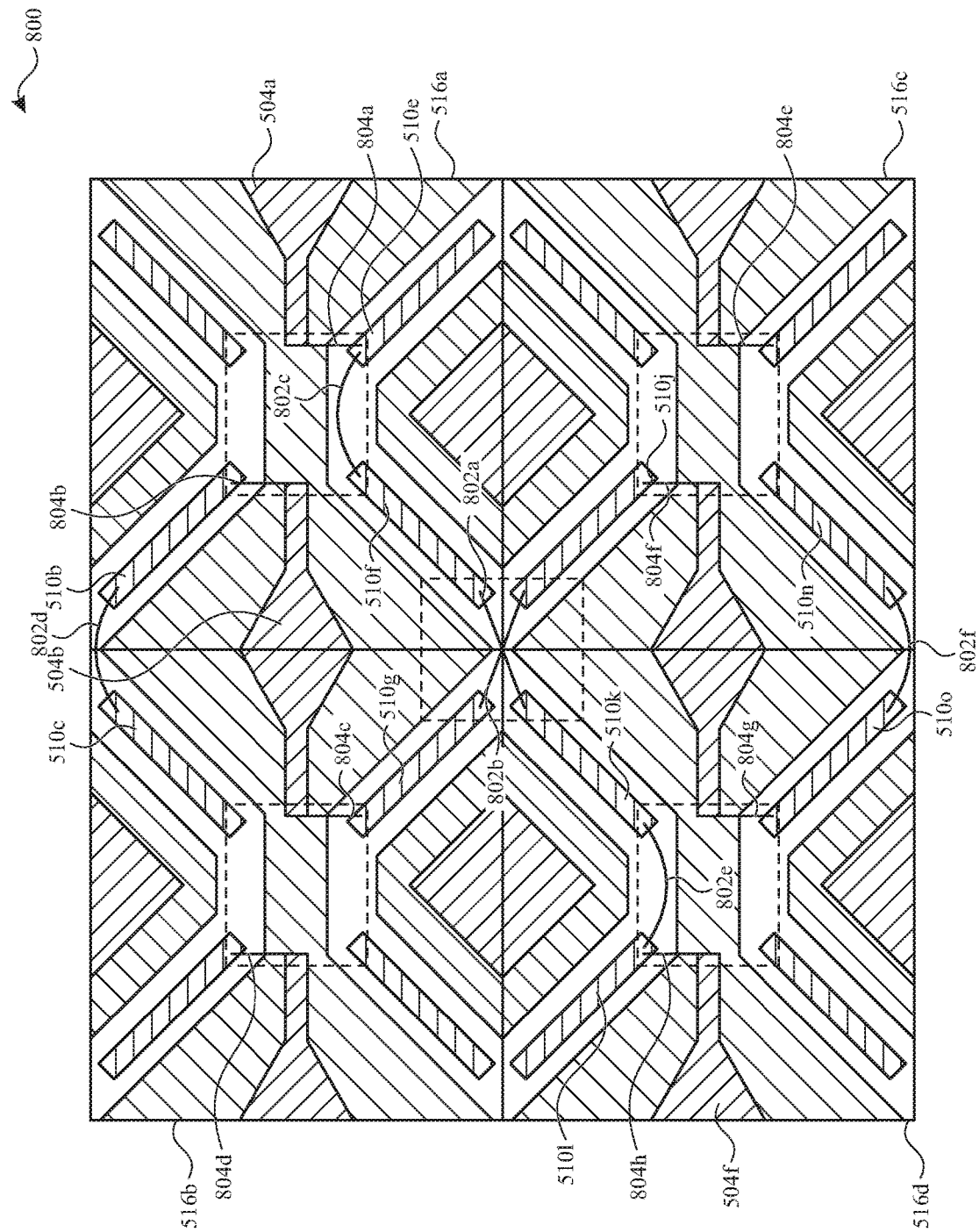
FIG. 8 illustrates another exemplary bridge arrangement connecting different ground/floating electrodes of four adjacent touch cells arranged in a diamond X pattern according to examples of the disclosure.

FIG. 8 illustrates another exemplary bridge arrangement connecting different ground/floating electrodes of four adjacent touch cells arranged in a diamond X pattern according to examples of the disclosure. Specifically, in configuration 800 of FIG. 8, bridges 802*a*-802*f* can connect different ground/floating electrodes forming an X shape together and bridges 804*a*-804*h* can connect a ground/floating electrode forming an X shape to a ground/floating electrode embedded inside a sense electrode. For example, electrode 510*f* of touch unit cell 516*a* can be connected to electrode 510*k* of touch unit cell 516*d* via bridge 802*a* and electrode 510*g* of touch unit cell 516*b* can be connected to electrode 510*j* of touch unit cell 516*c* via bridge 802*b* (though in some examples, electrode 510*f* of touch unit cell 516*a* can be contiguous with electrode 510*k* of touch unit cell 516*d*, electrode 510*g* of touch unit cell 516*b*, and electrode 510*j* of touch unit cell 516*c*, as described above). It is to be understood that the set of connections described above are described as an example and one or more similar sets of connections can be located in other portions of the single layer touch panel. Additionally, for example, electrode 510*e* can be connected to electrode 510*f* of touch unit cell 516*a* via bridge 802*c*, electrode 510*b* of touch unit cell 516*a* can be connected to electrode 510*c* of touch unit cell 516*b* via bridge 802*d*, electrode 510*k* can be connected to electrode 510*l* of touch unit cell 516*d* via bridge 802*e* and electrode 510*o* of touch unit cell 516*d* can be connected to electrode 510*n* of touch unit cell 516*c* via bridge 802*f* (though in some examples, electrode 510*e* can be contiguous with electrode 510*f* of touch unit cell 516*a*, electrode 510*b* of touch unit cell 516*a* can be contiguous with electrode 510*c* of touch unit cell 516*b*, electrode 510*k* can be contiguous with electrode 510*l* of touch unit cell 516*d*, and electrode 510*o* of touch unit cell 516*d* can be contiguous with electrode 510*n* of touch unit cell 516*c*, as described above). Additionally, for example, for touch unit cell 516*a*, electrode 504*b* can be connected to electrode 510*b* via bridge 804*b* and electrode 504*a* can be connected to electrode 510*e* via bridge 804*a*. In some examples, electrodes 504*a* and 504*f* located at the outer edges (e.g., left and right edges) of the touch sensor panel and at the end of the electrode chain can be coupled to an outside reference voltage such as ground thereby grounding all the electrodes connected to electrodes 504*a* and 504f via bridges. In some examples, electrodes 504a and 504f located at the outer edges (e.g., left and right edges) of the touch sensor panel and at the end of the electrode chain can be floating (e.g., at high impedance, or uncoupled from any voltage source) thereby leaving all the electrodes connected to electrodes 504a, and 504f via bridges floating. In some examples, the electrodes 506 embedded within drive electrodes 508 can be floating while electrodes 504 and 510 can be grounded. In some examples, the bridges can be implemented in one or more layers including the touch layer. For example, in FIG. 8, bridges 802a-802f can be implemented in the touch layer and bridges 804a-804h can be implemented in a separate layer or vice-versa. In some examples, the bridges can be implemented in one or more layers different from the touch layer. For example, bridges 802b-802f and bridges 804a-804h can be implemented in a first bridge layer and bridge 802a can be implemented in a second bridge layer.

Figure 9:
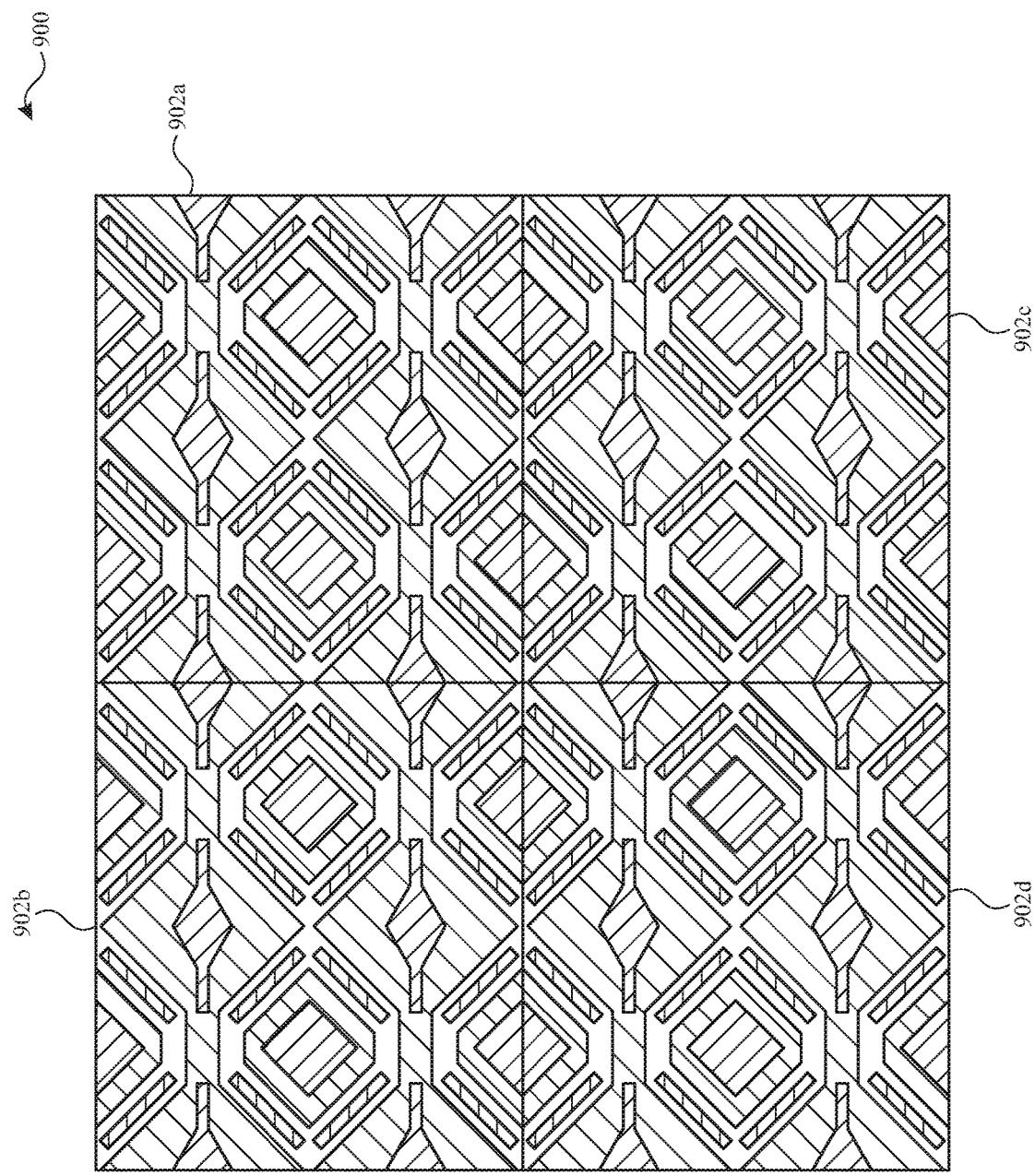
FIG. 9 illustrates an exemplary single layer touch sensor panel configuration showing four touch cells arranged in a diamond D pattern with drive electrodes, sense electrodes and ground/floating electrodes embedded inside the drive and the sense electrodes and surrounding the drive and the sense electrodes as shields according to examples of the disclosure.

FIG. 9 illustrates an exemplary single layer touch sensor panel configuration showing four touch cells arranged in a diamond D pattern with drive electrodes, sense electrodes and ground/floating electrodes embedded inside the drive and the sense electrodes and surrounding the drive and the sense electrodes as shields according to examples of the disclosure. Specifically, in configuration 900 of FIG. 9, four touch cells 902a-902d can be arranged in a diamond D pattern in a single layer touch sensor panel (it is understood that the touch sensor panel of the disclosure can include fewer or more touch cells 902 than those illustrated in FIG. 9). In some examples, as stated with respect to FIG. 5, the single layer touch sensor panel of FIG. 9 can be implemented in an ITO layer (e.g., the drive, sense and/or the ground/floating electrodes can be formed of ITO in a single layer on the touch sensor panel). In some examples, as stated with respect to FIG. 5, the single layer touch sensor panel of FIG. 9 can be implemented in a metal mesh layer (e.g., the drive, sense and/or the ground/floating electrodes can be formed of metal mesh in a single layer on the touch sensor panel). In some examples, the single layer touch sensor panel can be implemented as a mix of ITO and metal mesh, or can be implemented with other materials. The configuration 900 of FIG. 9 can be similar to the configuration 500 of FIG. 5 in that it can include drive electrodes, sense electrodes and ground and/or floating electrodes embedded inside the drive and the sense electrodes and surrounding the drive and the sense electrodes as shields that can be disposed in the same layer as the drive and sense electrodes, though electrically isolated from the drive and sense electrodes, as described with reference to FIGS. 5-8. Moreover, the various connections between different elements described with respect to the configuration 500 of FIG. 5 including the bridge connection schemes described with reference to FIGS. 6-8 and 10-11 can apply to configuration 900 of FIG. 9. The configuration 900 of FIG. 9 can be different from the configuration 500 of FIG. 5 in that the configuration 900 can be more dense. For example, the chip area occupied by cells 902a-902d of configuration 900 can be the same as the chip area occupied by cells 516a-516d of configuration 500. In some examples, as illustrated in FIGS. 5 and 9, a touch unit cell 902a of configuration 900 can include four times as many elements as a touch unit cell 516a of configuration 500. In some examples, a touch unit cell 902a can include four times as many sense electrodes as included in a touch unit cell 516a. In some examples, a touch unit cell 902a can include twice as many sense lines as included in a touch unit cell 516a. In some examples, two sense lines of a touch unit cell 902a can be connected to one sense amplifier (e.g., as compared to the examples of FIGS. 5-8 in which each sense line was connected to its own sense amplifier). In some examples, a touch unit cell 902a can include four times as many drive electrodes as included in a touch unit cell 516a. In some examples, a touch unit cell 902a can include twice as many drive lines as included in a touch unit cell 516a. In some examples, two drive lines of a touch unit cell 902a can be connected to one drive circuitry (e.g., as compared to the examples of FIGS. 5-8 in which each drive line was connected to its own drive circuitry).

Figure 10:
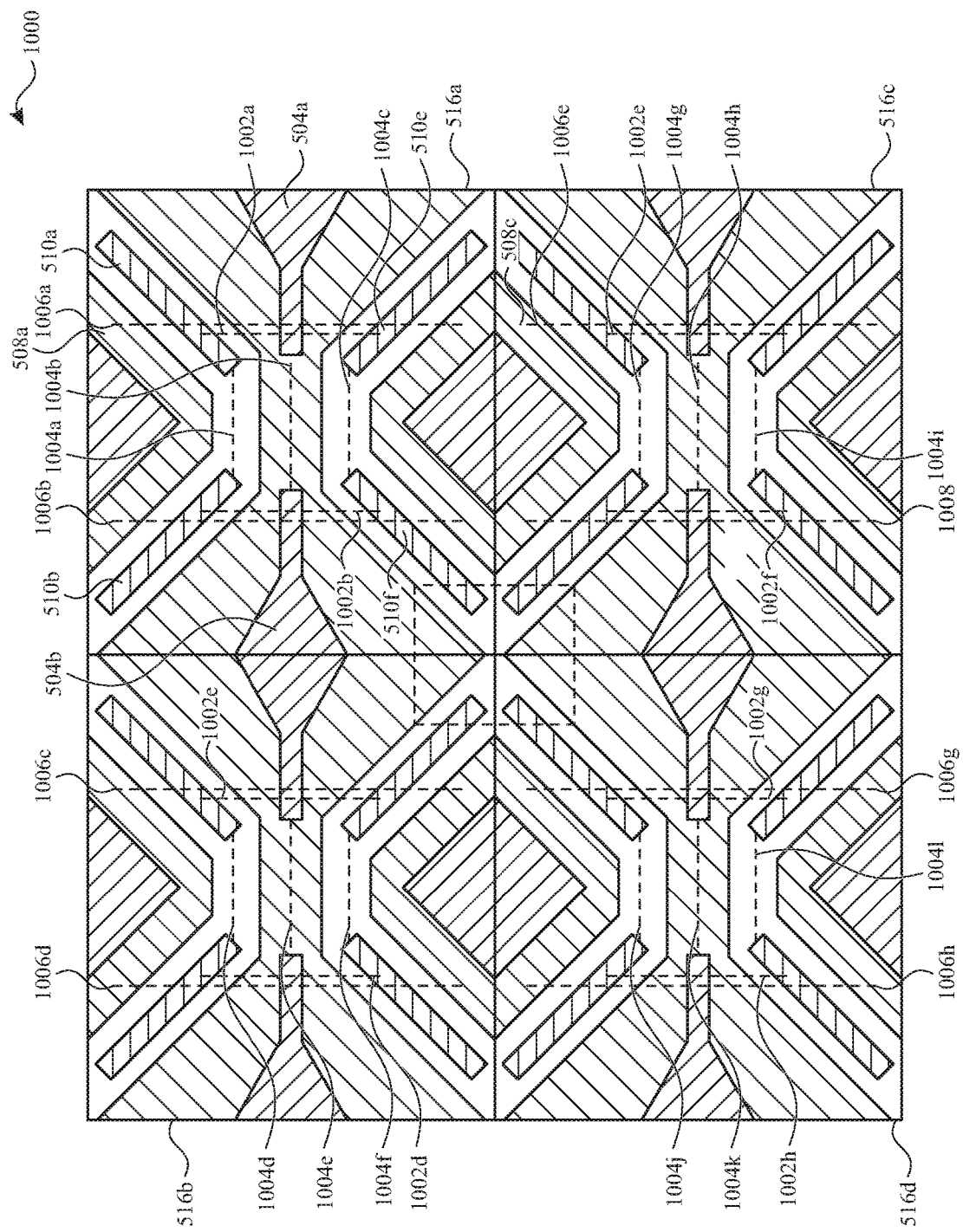
FIG. 10 illustrates an exemplary bridge arrangement connecting different ground/floating electrodes and drive electrodes of four adjacent touch cells arranged in a diamond X pattern according to examples of the disclosure.

FIG. 10 illustrates an exemplary bridge arrangement connecting different ground/floating electrodes and drive electrodes of four adjacent touch cells arranged in a diamond X pattern according to examples of the disclosure. Specifically, in configuration 1000 of FIG. 10, bridges 1002a-1002h can vertically connect ground/floating electrodes forming an X shape to other ground/floating electrodes forming an X shape (it is understood that the touch sensor panel of the disclosure can include fewer or more bridges 1002 than those illustrated in FIG. 10), and bridges 1004a-1004l can horizontally connect ground/floating electrodes forming an X shape to other ground/floating electrodes forming an X shape or ground/floating electrodes embedded inside sense electrodes to other ground/floating electrodes embedded inside sense electrodes (it is understood that the touch sensor panel of the disclosure can include fewer or more bridges 1004 than those illustrated in FIG. 10). In some examples, bridges 1006a-1006h can vertically connect drive electrodes to other drive electrodes (it is understood that the touch sensor panel of the disclosure can include fewer or more bridges 1006 than those illustrated in FIG. 10).

In some examples, the bridges 1002a-1002h, 1004a-1004l and 1006a-1006h can be formed on different bridge layers. In some examples, the bridge layers can include one or more ground/floating electrodes. For example, in an exemplary arrangement, ground/floating electrodes 510a-510p can be in a bridge layer separate from a touch layer and drive electrodes 508a-508f can be in a touch layer. In some examples all the bridges 1002a-1002h, 1004a-1004l and 1006a-1006h can be formed on a single bridge layer separate from a touch layer. In some examples, when all the bridges 1002a-1002h, 1004a-1004l and 1006a-1006h are formed on a single bridge layer separate from a touch layer, the bridges 1006a-1006h vertically connecting a drive electrode to another drive electrode can be formed on the outside of the bridges 1002a-1002h and 1004a-1004l connecting various ground/floating electrodes. Specifically, in configuration 1000 of FIG. 10, for touch cell 516a, vertical bridges 1006a and 1006b can connect drive electrodes 508a and 508c and can be formed outside of vertical bridges 1002a and 1002b and horizontal bridges 1004a-1004c. Moreover, for touch cell 516a, vertical bridge 1002a can connect ground electrodes 510a and 510e, vertical bridge 1002b can connect ground electrodes 510b and 510f, horizontal bridge 1004a can connect ground electrodes 510a and 510b, horizontal bridge 1004b can connect ground electrodes 504a and 504b and horizontal bridge 1004c can connect ground electrodes 510e and 510f.

In some examples, one or more of the bridges 1002a-1002h and 1004a-1004l may not be present. For example, in another exemplary arrangement, for touch cell 516a, vertical bridges 1002a and 1002b connecting ground electrodes may not be present and horizontal bridge 1004a can connect ground electrodes 510a and 510b, horizontal bridge 1004b can connect ground electrodes 504a and 504b, horizontal bridge 1004c can connect ground electrodes 510e and 510f and vertical bridges 1006a and 1006b can connect drive electrodes 508*a* and 508*c* and can be formed outside of horizontal bridges 1004*a*-1004*c*.

In some examples, a ground/floating electrode forming an X shape may not be connected to another ground/floating electrode forming an X shape via a bridge—instead, the ground/floating electrodes forming an X shape may be coupled to form a contiguous electrode. For example, in an exemplary arrangement, for touch cell 516*a*, ground electrodes 510*a* and 510*b* can be connected to form a contiguous segment, ground electrodes 510*e* and 510*f* can be connected to form a contiguous segment, horizontal bridge 1004*b* can connect ground electrodes 504*a* and 504*b* and vertical bridges 1006*a* and 1006*b* can connect drive electrodes 508*a* and 508*c* and can be formed on the outside of horizontal bridges 1004*b*.

In some examples, a ground/floating electrode embedded inside a sense electrode may not be connected to another ground/floating electrode embedded inside a sense electrode. For example, in an exemplary arrangement, for touch cell 516*a*, horizontal bridge 1004*a* can connect ground electrodes 510*a* and 510*b*, horizontal bridge 1004*c* can connect ground electrodes 510*e* and 510*f*, vertical bridge 1002*a* can connect ground electrodes 510*a* and 510*e*, vertical bridge 1002*b* can connect ground electrodes 510*b* and 510*f* and vertical bridges 1006*a* and 1006*b* can connect drive electrodes 508*a* and 508*c* and can be formed outside of vertical bridges 1002*a* and 1002*b* and horizontal bridges 1004*a* and 1004*c*.

In some examples, vertical bridges connecting various ground electrodes may not be present. For example, in another exemplary arrangement, for touch cell 516*a*, horizontal bridge 1004*a* can connect ground electrodes 510*a* and 510*b*, horizontal bridge 1004*c* can connect ground electrodes 510*e* and 510*f*, and vertical bridges 1006*a* and 1006*b* can connect drive electrodes 508*a* and 508*c* and can be formed outside of horizontal bridges 1004*a* and 1004*c*.

In some examples, a ground/floating electrode embedded inside a sense electrode may not be connected to another ground/floating electrode embedded inside a sense electrode and a ground/floating electrode forming an X shape may not be connected to another ground/floating electrode forming an X shape via a bridge, but, instead the ground/floating electrodes forming an X shape may be coupled to form a contiguous electrode. For example, in another exemplary arrangement, for touch cell 516*a*, ground electrodes 510*a* and 510*b* can be connected to form a contiguous electrode, ground electrodes 510*e* and 510*f* can be connected to form a contiguous electrode, and vertical bridges 1006*a* and 1006*b* can connect drive electrodes 508*a* and 508*c*.

Figure 11:
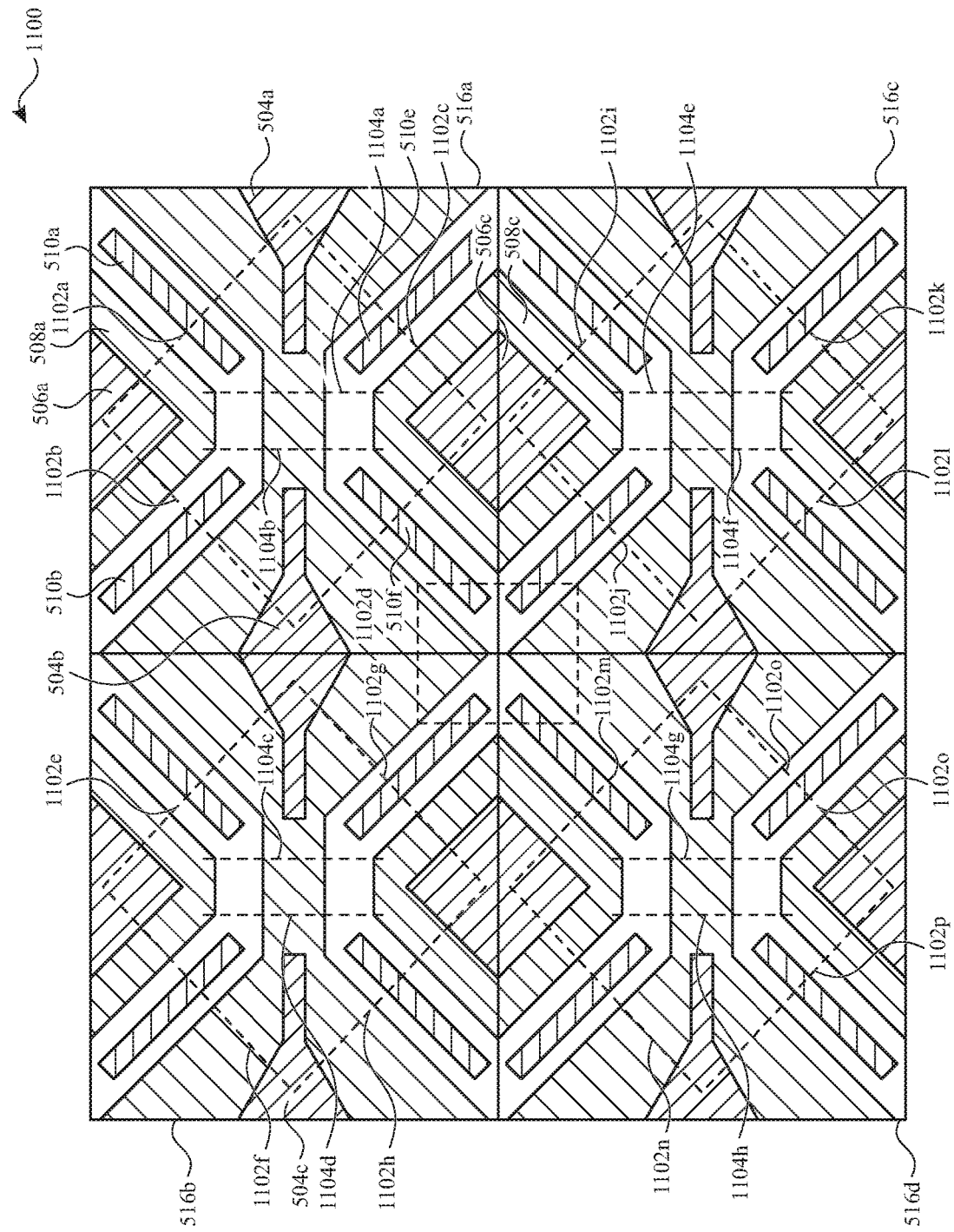
FIG. 11 illustrates another exemplary bridge arrangement connecting different ground/floating electrodes and drive electrodes of four adjacent touch cells arranged in a diamond X pattern according to examples of the disclosure.

FIG. 11 illustrates another exemplary bridge arrangement connecting different ground/floating electrodes and drive electrodes of four adjacent touch cells arranged in a diamond X pattern according to examples of the disclosure. Specifically, in configuration 1100 of FIG. 11, bridges 1102*a*-1102*k* can connect ground/floating electrodes embedded inside drive electrodes to ground/floating electrodes embedded inside sense electrodes (it is understood that the touch sensor panel of the disclosure can include fewer or more bridges 1102 than those illustrated in FIG. 11), and bridges 1104*a*-1004*h* can vertically connect drive electrodes to other drive electrodes (it is understood that the touch sensor panel of the disclosure can include fewer or more bridges 1104 than those illustrated in FIG. 11). In some examples, the bridges 1102*a*-1102*k* and 1104*a*-1004*h* can be present on different bridge layers. In some examples, the bridge layers can include one or more ground/floating electrodes. For example, in an exemplary arrangement, ground/floating electrodes 510*a*-510*p* can be in one of the bridge layers separate from a touch layer and drive electrodes 508*a*-508*f* can be in a touch layer. In some examples all the bridges 1102*a*-1102*k* and 1104*a*-1104*h* can be formed on a single bridge layer separate from a touch layer.

For example, in another exemplary arrangement, for touch cell 516*a*, ground electrodes 510*a* and 510*b* can be connected to form a contiguous electrode, ground electrodes 510*e* and 510*f* can be connected to form a contiguous electrode, vertical bridges 1104*a* and 1104*b* can connect drive electrodes 508*a* and 508*c*, bridge 1102*a* can connect electrode 506*a* to electrode 504*a*, bridge 1102*b* can connect electrode 506*a* to electrode 504*b*, bridge 1102*c* can connect electrode 506*c* to electrode 504*a*, and bridge 1102*d* can connect electrode 506*a* to electrode 504*c*.

In some examples, ground electrodes 510*a* and 510*b* and ground electrodes 510*e* and 510*f* may not form contiguous electrodes and may be connected via bridges. For example, in another exemplary arrangement, for touch cell 516*a*, horizontal bridge 1004*a* (from FIG. 10) can connect ground electrodes 510*a* and 510*b*, horizontal bridge 1004*c* (from FIG. 10) can connect ground electrodes 510*e* and 510*f*, vertical bridge 1002*a* (from FIG. 10) can connect ground electrodes 510*a* and 510*e*, vertical bridge 1002*b* (from FIG. 10) can connect ground electrodes 510*b* and 510*f*, vertical bridges 1104*a* and 1104*b* can connect drive electrodes 508*a* and 508*c*, bridge 1102*a* can connect electrode 506*a* to electrode 504*a*, bridge 1102*b* can connect electrode 506*a* to electrode 504*b*, bridge 1102*c* can connect electrode 506*c* to electrode 504*a*, and bridge 1102*d* can connect electrode 506*a* to electrode 504*c*.

Figure 12:
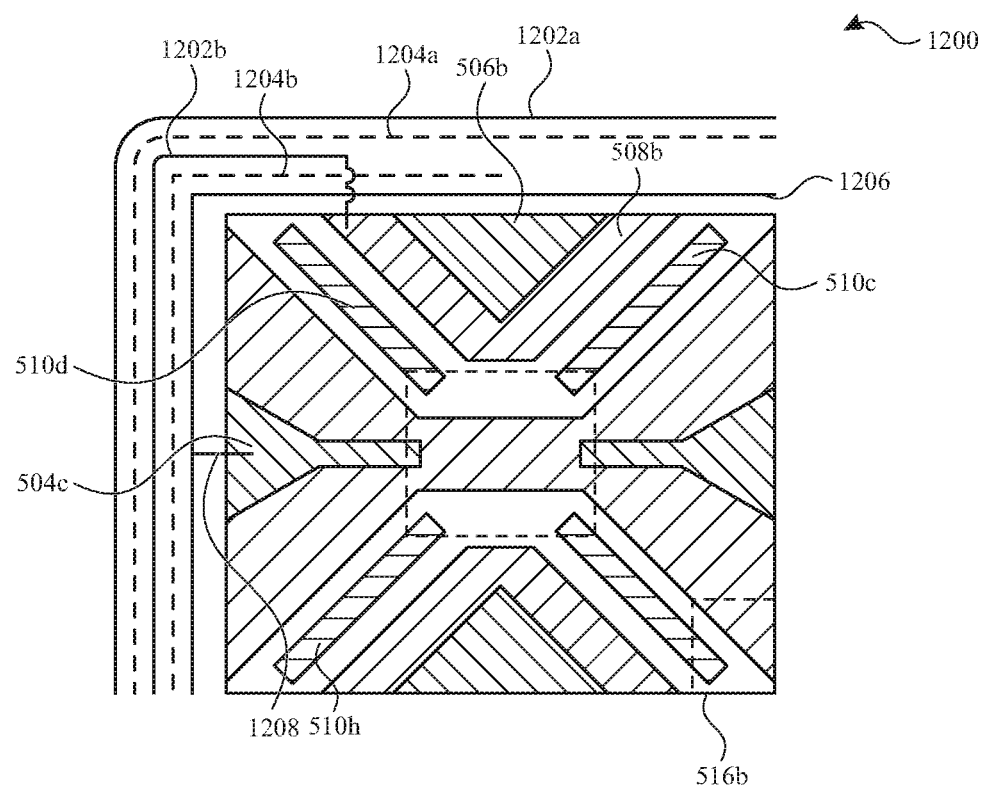
FIG. 12 illustrates an exemplary routing arrangement connecting a ground ring and different sense and drive traces to ground electrodes, sense electrodes and drive electrodes respectively according to examples of the disclosure.

FIG. 12 illustrates an exemplary routing arrangement connecting a ground ring and different sense and drive traces to ground electrodes, sense electrodes and drive electrodes respectively according to examples of the disclosure. Specifically, in configuration 1200 of FIG. 12, a ground or shielding ring can surround one or more borders of the touch panel (e.g., can extend along and/or around the perimeter of the touch panel). In some examples, one or more drive traces, one or more sense traces and one or more guard traces can surround one or more borders of the touch panel. The ground or shielding ring can minimize cross-talk between drive or sense traces and the touch panel and can also allow for connection to the ground electrodes of the touch panel, and can be coupled to a ground voltage or a reference voltage or other shielding voltage. In some examples, the guard traces surrounding the borders of the touch panel can be coupled to a voltage source (e.g., a guard voltage, a ground voltage or a reference voltage) other than the ground voltage source supplying the ground ring or ground traces. In some examples, a guard trace can be placed between a sense trace and a drive trace. In some examples, a guard trace can be placed between a sense trace and a ground trace. In some examples, a guard trace can be placed between a drive trace and a ground trace. In some examples, guard traces can reduce cross-talk between a drive trace and a ground trace or between a ground trace and a sense trace or between a drive trace and a sense trace. As illustrated in FIG. 12, for touch unit cell 516*b*, ground ring 1206, drive traces 1202*a* and 1202*b* and guard traces 1204*a* and 1204*b* can surround the border of touch cell 516*b* (it is understood that the touch sensor panel of the disclosure can include fewer or more drive traces and guard traces than those illustrated in FIG. 12). In some examples, as illustrated in FIG. 12, for touch unit cell 516*b*, drive trace 1202*b* can be connected to drive electrode 508*b* (thereby providing drive signals to the drive electrodes of the touch panel that are connected to drive electrode 508*b* as described in the figures above). Other drive electrodes on the border of the touch sensor panel can similarly be coupled to corresponding drive traces in the border region of the touch sensor panel (e.g., another column of drive electrodes can be coupled to drive trace 1202*a*). In some examples, as illustrated in FIG. 12, for touch unit cell 516*b*, trace 1208 can connect ground ring 1206 to ground electrode 504*c* thereby providing a reference voltage to the ground electrodes of the touch panel that are connected to ground electrode 504*c* as described in the figures above (e.g., ground ring 1206 can be coupled to a ground/reference voltage source). Other ground electrodes on the border of the touch sensor panel (e.g., electrodes 504, 506 and/or 510) can similarly be coupled to ground ring 1206. Ground/floating electrodes on the border of the touch sensor panel that are not coupled to ground ring 1206 can be floating (and ground/floating electrodes that are coupled to those electrodes within the touch sensor panel can, thus, also be floating). Additionally, the border region of the touch sensor panel can include sense traces in a manner analogous to the drive traces, and sense electrodes 502 on the border of the touch sensor panel can be coupled to corresponding sense traces in such border region.

Thus, the examples of the disclosure provide various configurations for a single layer touch sensor panel.

Therefore, according to the above, some examples of the disclosure are directed to a touch sensor panel comprising: a first layer including: a plurality of drive lines including drive electrodes, wherein the drive lines are configured to be coupled to drive circuitry during touch sensing on the touch sensor panel; a plurality of sense lines including sense electrodes, wherein the sense lines are configured to be coupled to sense circuitry during touch sensing on the touch sensor panel; and a plurality of first shielding electrodes, wherein the first shielding electrodes are disposed between the drive electrodes and the sense electrodes; and a second layer, different than the first layer, including one or more bridges electrically coupling at least two of the first shielding electrodes together. Additionally or alternatively to one or more of the examples disclosed above, in some examples, the plurality of drive lines are arranged along a first direction and the plurality of sense lines are arranged along a second direction, different than the first direction on the touch sensor panel. Additionally or alternatively to one or more of the examples disclosed above, in some examples, the second layer further includes one or more bridges electrically coupling at least two of the plurality of drive electrodes together. Additionally or alternatively to one or more of the examples disclosed above, in some examples, the second layer further includes one or more bridges electrically coupling at least two of the plurality of sense electrodes together. Additionally or alternatively to one or more of the examples disclosed above, in some examples, the first layer further includes a plurality of second shielding electrodes disposed within the drive electrodes and within the sense electrodes, and the second layer further includes one or more bridges electrically coupling at least one of the first shielding electrodes to at least one of the second shielding electrodes. Additionally or alternatively to one or more of the examples disclosed above, in some examples, the first shielding electrodes include: a first set of shielding electrodes that includes shielding electrodes that are disposed between different drive and sense electrodes, wherein the first set of shielding electrodes are electrically coupled together using the one or more bridges; and a second set of shielding electrodes that includes contiguous shielding electrodes, different portions of which are disposed between different drive and sense electrodes. Additionally or alternatively to one or more of the examples disclosed above, in some examples, the first shielding electrodes form X-shaped structures disposed between the drive electrodes and the sense electrodes. Additionally or alternatively to one or more of the examples disclosed above, in some examples, the plurality of first shielding electrodes include shielding electrodes disposed between different drive electrode and sense electrode pairs, the plurality of first shielding electrodes include a plurality of sets of shielding electrodes, each set of shielding electrodes of the plurality of sets of shielding electrodes comprising shielding electrodes that are electrically coupled together, and each set of shielding electrodes of the plurality of sets of shielding electrodes is disposed on a single side of, and adjacent to, a different respective sense line. Additionally or alternatively to one or more of the examples disclosed above, in some examples, the plurality of first shielding electrodes include shielding electrodes disposed between different drive electrode and sense electrode pairs, the plurality of first shielding electrodes include a plurality of sets of shielding electrodes, each set of shielding electrodes of the plurality of sets of shielding electrodes comprising shielding electrodes that are electrically coupled together, and each set of shielding electrodes of the plurality of sets of shielding electrodes is disposed on a single side of, and adjacent to, a different respective drive line. Additionally or alternatively to one or more of the examples disclosed above, in some examples, the first layer further includes a plurality of second shielding electrodes disposed within the sense electrodes, the plurality of second shielding electrodes include a plurality of sets of shielding electrodes comprising shielding electrodes that are electrically coupled together, and each set of shielding electrodes of the plurality of sets of shielding electrodes is disposed within a different respective sense line. Additionally or alternatively to one or more of the examples disclosed above, in some examples, the plurality of first shielding electrodes include shielding electrodes disposed between different drive electrode and sense electrode pairs, the first layer further includes a plurality of second shielding electrodes disposed within the sense electrodes, the plurality of first shielding electrodes and the plurality of second shielding electrodes include a plurality of sets of shielding electrodes comprising shielding electrodes that are electrically coupled together, and each set of shielding electrodes of the plurality of sets of shielding electrodes includes shielding electrodes from the plurality of first shielding electrodes and the plurality of second shielding electrodes. Additionally or alternatively to one or more of the examples disclosed above, in some examples, the plurality of first shielding electrodes include shielding electrodes disposed between different drive electrode and sense electrode pairs, the first layer further includes a plurality of second shielding electrodes disposed within the sense electrodes, and the second layer includes one or more bridges electrically coupling at least two of the drive electrodes together, and one or more bridges electrically coupling at least two of the second shielding electrodes together. Additionally or alternatively to one or more of the examples disclosed above, in some examples, the first layer further includes: a plurality of second shielding electrodes disposed within the sense electrodes, and a plurality of third shielding electrodes disposed within the drive electrodes, and the second layer includes one or more bridges electrically coupling at least one second shielding electrode in the plurality of second shielding electrodes to at least one third shielding electrode in the plurality of third shielding electrodes. Additionally or alternatively to one or more of the examples disclosed above, in some examples, the touch sensor panel further comprises: a shielding ring disposed in a border region of the touch sensor panel, wherein the plurality of first shielding electrodes are electrically coupled to the shielding ring at the border region of the touch sensor panel. Additionally or alternatively to one or more of the examples disclosed above, in some examples, the border region of the touch sensor panel further includes a sense trace electrically coupled to one or more sense electrodes at the border region, and a drive trace electrically coupled to the one or more drive electrodes at the border region, and a guard trace is disposed between the sense trace and the drive trace in the border region. Additionally or alternatively to one or more of the examples disclosed above, in some examples, the drive electrodes, the sense electrodes, and the first shielding electrodes are formed of metal mesh, and the drive electrodes, the sense electrodes, and the first shielding electrodes are electrically isolated from one another by electrical discontinuities in the metal mesh.

Some examples of the disclosure are directed to a method of fabricating a touch sensor panel, the method comprising: forming a first layer including: a plurality of drive lines including drive electrodes, wherein the drive electrodes are configured to be coupled to drive circuitry during touch sensing on the touch sensor panel; a plurality of sense lines including sense electrodes, wherein the sense electrodes are configured to be coupled to sense circuitry during the touch sensing on the touch sensor panel; and a plurality of first shielding electrodes, wherein the first shielding electrodes are disposed between the drive electrodes and the sense electrodes; and forming a second layer, different than the first layer, including one or more bridges electrically coupling at least two of the first shielding electrodes together. Additionally or alternatively to one or more of the examples disclosed above, in some examples, the plurality of drive lines are arranged along a first direction and the plurality of sense lines are arranged along a second direction, different than the first direction on the touch sensor panel. Additionally or alternatively to one or more of the examples disclosed above, in some examples, the second layer further includes one or more bridges electrically coupling at least two of the plurality of drive electrodes together. Additionally or alternatively to one or more of the examples disclosed above, in some examples, the second layer further includes one or more bridges electrically coupling at least two of the plurality of sense electrodes together. Additionally or alternatively to one or more of the examples disclosed above, in some examples, the first layer further includes a plurality of second shielding electrodes disposed within the drive electrodes and the sense electrodes, and the second layer further includes one or more bridges electrically coupling at least one of the first shielding electrodes to at least one of the second shielding electrodes. Additionally or alternatively to one or more of the examples disclosed above, in some examples, the first shielding electrodes include: a first set of shielding electrodes that includes shielding electrodes that are disposed between different drive and sense electrodes and are electrically coupled together using the one or more bridges; and a second set of shielding electrodes that includes contiguous shielding electrodes, different portions of which are disposed between different drive and sense electrodes. Additionally or alternatively to one or more of the examples disclosed above, in some examples, the first shielding electrodes form X-shaped structures disposed between the drive electrodes and the sense electrodes. Additionally or alternatively to one or more of the examples disclosed above, in some examples, the plurality of first shielding electrodes include shielding electrodes disposed between different drive electrode and sense electrode pairs, the plurality of first shielding electrodes include a plurality of sets of shielding electrodes, each set of shielding electrodes of the plurality of sets of shielding electrodes comprising shielding electrodes that are electrically coupled together, and each set of shielding electrodes of the plurality of sets of shielding electrodes is disposed on a single side of, and adjacent to, a different respective sense line. Additionally or alternatively to one or more of the examples disclosed above, in some examples, the plurality of first shielding electrodes include shielding electrodes disposed between different drive electrode and sense electrode pairs, the plurality of first shielding electrodes include a plurality of sets of shielding electrodes, each set of shielding electrodes of the plurality of sets of shielding electrodes comprising shielding electrodes that are electrically coupled together, and each set of shielding electrodes of the plurality of sets of shielding electrodes is disposed on a single side of, and adjacent to, a different respective drive line. Additionally or alternatively to one or more of the examples disclosed above, in some examples, the first layer further includes a plurality of second shielding electrodes disposed within the sense electrodes, the plurality of second shielding electrodes include a plurality of sets of shielding electrodes comprising shielding electrodes that are electrically coupled together, and each set of shielding electrodes of the plurality of sets of shielding electrodes is disposed within a different respective sense line. Additionally or alternatively to one or more of the examples disclosed above, in some examples, the plurality of first shielding electrodes include shielding electrodes disposed between different drive electrode and sense electrode pairs, the first layer further includes a plurality of second shielding electrodes disposed within the sense electrodes, the plurality of first shielding electrodes and the plurality of second shielding electrodes include a plurality of sets of shielding electrodes comprising shielding electrodes that are electrically coupled together, and each set of shielding electrodes of the plurality of sets of shielding electrodes includes shielding electrodes from the plurality of first shielding electrodes and the plurality of second shielding electrodes. Additionally or alternatively to one or more of the examples disclosed above, in some examples, the plurality of first shielding electrodes include shielding electrodes disposed between different drive electrode and sense electrode pairs, the first layer further includes a plurality of second shielding electrodes disposed within the sense electrodes, and the second layer includes one or more bridges electrically coupling at least two of the drive electrodes together, and one or more bridges electrically coupling at least two of the second shielding electrodes together. Additionally or alternatively to one or more of the examples disclosed above, in some examples, the first layer further includes: a plurality of second shielding electrodes disposed within the sense electrodes, and a plurality of third shielding electrodes disposed within the drive electrodes, and the second layer includes one or more bridges electrically coupling at least one second shielding electrode in the plurality of second shielding electrodes to at least one third shielding electrode in the plurality of third shielding electrodes. Additionally or alternatively to one or more of the examples disclosed above, in some examples, the touch sensor panel further comprises: a shielding ring disposed in a border region of the touch sensor panel, wherein the plurality of first shielding electrodes are electrically coupled to the shielding ring at the border region of the touch sensor panel. Additionally or alternatively to one or more of the examples disclosed above, in some examples, the border region of the touch sensor panel further includes a sense trace electrically coupled to one or more sense electrodes at the border region, and a drive trace electrically coupled to the one or more drive electrodes at the border region, and a guard trace is disposed between the sense trace and the drive trace in the border region. Additionally or alternatively to one or more of the examples disclosed above, in some examples, the drive electrodes, the sense electrodes, and the first shielding electrodes are formed of metal mesh, and the drive electrodes, the sense electrodes, and the first shielding electrodes are electrically isolated from one another by electrical discontinuities in the metal mesh.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
a first layer including:
a plurality of drive lines including drive electrodes, wherein the drive lines are arranged along a first direction and are configured to be coupled to drive circuitry during touch sensing on the touch sensor panel;
a plurality of sense lines including sense electrodes, wherein the sense lines are arranged along a second direction, different than the first direction, and are configured to be coupled to sense circuitry during touch sensing on the touch sensor panel; and
a plurality of first shielding electrodes, wherein the first shielding electrodes are disposed between the drive electrodes and the sense electrodes; and
a second layer, different than the first layer, including one or more bridges electrically coupling at least two of the first shielding electrodes together.

2. The touch sensor panel of claim 1, wherein the second layer further includes one or more bridges electrically coupling at least two of the plurality of drive electrodes together.

3. The touch sensor panel of claim 1, wherein the second layer further includes one or more bridges electrically coupling at least two of the plurality of sense electrodes together.

4. The touch sensor panel of claim 1, wherein the first layer further includes a plurality of second shielding electrodes disposed within the drive electrodes and within the sense electrodes, and the second layer further includes one or more bridges electrically coupling at least one of the first shielding electrodes to at least one of the second shielding electrodes.

5. The touch sensor panel of claim 1, wherein the first shielding electrodes include:
a first set of shielding electrodes that includes shielding electrodes that are disposed between different drive and sense electrodes, wherein the first set of shielding electrodes are electrically coupled together using the one or more bridges; and
a second set of shielding electrodes that includes contiguous shielding electrodes, different portions of which are disposed between different drive and sense electrodes.

6. The touch sensor panel of claim 1, wherein the first shielding electrodes form X-shaped structures disposed between the drive electrodes and the sense electrodes.

7. The touch sensor panel of claim 1, wherein:
the plurality of first shielding electrodes include shielding electrodes disposed between different drive electrode and sense electrode pairs,
the plurality of first shielding electrodes include a plurality of sets of shielding electrodes, each set of shielding electrodes of the plurality of sets of shielding electrodes comprising shielding electrodes that are electrically coupled together, and
each set of shielding electrodes of the plurality of sets of shielding electrodes is disposed on a single side of, and adjacent to, a different respective sense line.

8. The touch sensor panel of claim 1, wherein:
the plurality of first shielding electrodes include shielding electrodes disposed between different drive electrode and sense electrode pairs,
the plurality of first shielding electrodes include a plurality of sets of shielding electrodes, each set of shielding electrodes of the plurality of sets of shielding electrodes comprising shielding electrodes that are electrically coupled together, and
each set of shielding electrodes of the plurality of sets of shielding electrodes is disposed on a single side of, and adjacent to, a different respective drive line.

9. The touch sensor panel of claim 8, wherein:
the first layer further includes a plurality of second shielding electrodes disposed within the sense electrodes,
the plurality of second shielding electrodes include a plurality of sets of shielding electrodes comprising shielding electrodes that are electrically coupled together, and
each set of shielding electrodes of the plurality of sets of shielding electrodes is disposed within a different respective sense line.

10. The touch sensor panel of claim 1, wherein:
the plurality of first shielding electrodes include shielding electrodes disposed between different drive electrode and sense electrode pairs,
the first layer further includes a plurality of second shielding electrodes disposed within the sense electrodes,
the plurality of first shielding electrodes and the plurality of second shielding electrodes include a plurality of sets of shielding electrodes comprising shielding electrodes that are electrically coupled together, and
each set of shielding electrodes of the plurality of sets of shielding electrodes includes shielding electrodes from the plurality of first shielding electrodes and the plurality of second shielding electrodes.

11. The touch sensor panel of claim 1, wherein:
the plurality of first shielding electrodes include shielding electrodes disposed between different drive electrode and sense electrode pairs,
the first layer further includes a plurality of second shielding electrodes disposed within the sense electrodes, and
the second layer includes one or more bridges electrically coupling at least two of the drive electrodes together, and one or more bridges electrically coupling at least two of the second shielding electrodes together.

12. The touch sensor panel of claim 1, wherein:
the first layer further includes:
a plurality of second shielding electrodes disposed within the sense electrodes, and
a plurality of third shielding electrodes disposed within the drive electrodes, and the second layer includes one or more bridges electrically coupling at least one second shielding electrode in the plurality of second shielding electrodes to at least one third shielding electrode in the plurality of third shielding electrodes.

13. The touch sensor panel of claim 1, further comprising:
a shielding ring disposed in a border region of the touch sensor panel,
wherein the plurality of first shielding electrodes are electrically coupled to the shielding ring at the border region of the touch sensor panel.

14. The touch sensor panel of claim 13, wherein:
the border region of the touch sensor panel further includes a sense trace electrically coupled to one or more sense electrodes at the border region, and a drive trace electrically coupled to the one or more drive electrodes at the border region, and
a guard trace is disposed between the sense trace and the drive trace in the border region.

15. The touch sensor panel of claim 1, wherein:
the drive electrodes, the sense electrodes, and the first shielding electrodes are formed of metal mesh, and
the drive electrodes, the sense electrodes, and the first shielding electrodes are electrically isolated from one another by electrical discontinuities in the metal mesh.

16. A method of fabricating a touch sensor panel, the method comprising:
forming a first layer including:
a plurality of drive lines including drive electrodes, wherein the drive electrodes are arranged along a first direction and are configured to be coupled to drive circuitry during touch sensing on the touch sensor panel;
a plurality of sense lines including sense electrodes, wherein the sense electrodes are arranged along a second direction, different than the first direction, and are configured to be coupled to sense circuitry during the touch sensing on the touch sensor panel; and
a plurality of first shielding electrodes, wherein the first shielding electrodes are disposed between the drive electrodes and the sense electrodes; and
forming a second layer, different than the first layer, including one or more bridges electrically coupling at least two of the first shielding electrodes together.

17. An electronic device comprising:
a display; and
a touch sensor panel comprising:
a first layer including:
a plurality of drive lines including drive electrodes, wherein the drive lines are arranged along a first direction and are configured to be coupled to drive circuitry during touch sensing on the touch sensor panel;
a plurality of sense lines including sense electrodes, wherein the sense lines are arranged along a second direction, different than the first direction, and are configured to be coupled to sense circuitry during touch sensing on the touch sensor panel; and
a plurality of first shielding electrodes, wherein the first shielding electrodes are disposed between the drive electrodes and the sense electrodes; and
a second layer, different than the first layer, including one or more bridges electrically coupling at least two of the first shielding electrodes together.

18. The electronic device of claim 17, wherein the first layer further includes a plurality of second shielding electrodes disposed within the drive electrodes and within the sense electrodes, and the second layer further includes one or more bridges electrically coupling at least one of the first shielding electrodes to at least one of the second shielding electrodes.

19. The electronic device of claim 17, wherein the first shielding electrodes include:
a first set of shielding electrodes that includes shielding electrodes that are disposed between different drive and sense electrodes, wherein the first set of shielding electrodes are electrically coupled together using the one or more bridges; and
a second set of shielding electrodes that includes contiguous shielding electrodes, different portions of which are disposed between different drive and sense electrodes.

20. The electronic device of claim 17, wherein the first shielding electrodes form X-shaped structures disposed between the drive electrodes and the sense electrodes.

* * * * *